(12) United States Patent
Bachmann

(10) Patent No.: US 7,145,554 B2
(45) Date of Patent: Dec. 5, 2006

(54) METHOD FOR A HIGH-SPEED WRITING SYSTEM AND HIGH-SPEED WRITING DEVICE

(75) Inventor: Raphael Bachmann, Zurich (CH)

(73) Assignee: Speedscript Ltd., Zurich (CH)

( * ) Notice: Subject to any disclaimer, the term of this patent is extended or adjusted under 35 U.S.C. 154(b) by 198 days.

(21) Appl. No.: 10/168,983

(22) PCT Filed: Jul. 20, 2001

(86) PCT No.: PCT/CH01/00453

§ 371 (c)(1),
(2), (4) Date: Jun. 26, 2002

(87) PCT Pub. No.: WO02/08882

PCT Pub. Date: Jan. 31, 2002

(65) Prior Publication Data

US 2002/0180797 A1 Dec. 5, 2002

(30) Foreign Application Priority Data

Jul. 21, 2000 (CH) .................................... 1450/00

(51) Int. Cl.
G09G 5/00 (2006.01)
(52) U.S. Cl. ....................... 345/173; 345/156
(58) Field of Classification Search ................ 345/418, 345/582, 156–160, 168–172, 173, 179; 178/18.01–19.05, 178/20.01
See application file for complete search history.

(56) References Cited

U.S. PATENT DOCUMENTS

| 5,521,986 | A | * | 5/1996 | Curtin et al. ................ 382/187 |
| 6,008,799 | A | | 12/1999 | Van Kleeck |
| 6,031,525 | A | | 2/2000 | Perlin |
| 6,177,926 | B1 | * | 1/2001 | Kunert ........................ 345/173 |
| 6,295,052 | B1 | * | 9/2001 | Kato et al. .................. 345/179 |
| 6,724,355 | B1 | * | 4/2004 | Resor et al. .................. 345/33 |

FOREIGN PATENT DOCUMENTS

EP 0660218 A1 6/1995

OTHER PUBLICATIONS

Kathleen M. Potosnak, "Keys and Keyboards", Handbook of Human-Computer Interaction, M. Helander (ed.), Chapter 21; Elsevier Science Publishers B.V. (North-Holland), 1988.
Alge/Reber/Zürcher, Lehrbuch der deutschen Stenografie, 105. Auflage 1994.

* cited by examiner

*Primary Examiner*—Richard Hjerpe
*Assistant Examiner*—Mansour M. Said
(74) *Attorney, Agent, or Firm*—Buchanan Ingersoll & Rooney PC

(57) ABSTRACT

The invention concerns a high speed writing system and a high speed writing device with special menu selection for entering text by means of a pen and a touch-screen. This method of entering text is suitable for desktop PCs, laptop PCs, palmtop PCs, mobile phones (for SMS, WAP and e-mail), watches and other electronic devices. Significantly higher writing efficiency than on a QWERTY keyboard is reached with little investment in practicing time.

The monitor screen features a key section with all consonants of the alphabet, as well as one vowel key distinguished by its arrangement and function. All elements of the writing process defining the method can be generated by pen movements such as selection of a key or guiding it in one of eight stroke directions, as well as combinations of these pen movements The high speed writing devices described here excel by their small and ergonomically arranged entry sections, whereby all keys for text entry can be reached from one single hand position that never needs re-setting.

30 Claims, 30 Drawing Sheets

| Key | Double Tap | SPACE ↖ | BACK SPACE ↑ | DELETE ↗ |
|---|---|---|---|---|
| vowal | ///// | SPACE | BACK SPACE | DELETE |
| b | bb | B | be_ | bj |
| c | ch | C | could_ | can_ |
| d | dd | D | | do_ |
| f | ff | F | first_ | of_ |
| g | ng | G | | |
| h | | H | has_ | he_ |
| k | ck | K | | |
| l | ll | L | | last_ |
| m | mm | M | mp | mb |
| n | nn | N | nd | nc |
| p | pp | P | up_ | sp |
| q | | Q | | |
| r | rr | R | are_ | or_ |
| s | ss | S | sh | st |
| t | tt | T | th | to_ |
| v | | V | over_ | |
| w | two_ | W | wh | was_ |
| x | ///// | X | xp | |
| z | zz | Z | | |

Fig. 7

Figure Key

| Tap | 0 |
|---|---|
| → | 1 |
| ↘ | 2 |
| ↓ | 3 |
| ↙ | 4 |
| ← | 5 |
| ↖ | 6 |
| ↑ | 7 |
| ↗ | 8 |
| Double Tap | 9 |

Fig. 9

| | use_ | |
|---|---|---|
| U | SPACE | A |
| O | I | E |

| other_ | | one_ |
|---|---|---|
| into_ | BACK SPACE | you_ |
| in | is | it |

| | all_ | |
|---|---|---|
| and_ | DELETE | also_ |
| an | as | at |

| u_ | ul | ur |
|---|---|---|
| uu | u | ua |
| uo | ui | ue |

| SPACE | BACK SPACE | DELETE |
|---|---|---|
| u | ENTER | a |
| o | i | e |

| a_ | al | ar |
|---|---|---|
| au | a | aa |
| ao | ai | ae |

| o_ | ol | or |
|---|---|---|
| ou | o | oa |
| oo | oi | oe |

| i_ | j | y |
|---|---|---|
| iu | i | ia |
| io | ii | ie |

| e_ | el | er |
|---|---|---|
| eu | e | ea |
| eo | ei | ee |

Fig. 10A 31  32  33  34  35

METHOD FOR A HIGH-SPEED WRITING SYSTEM AND HIGH-SPEED WRITING DEVICE

FIELD OF THE INVENTION

The present invention describes a method for a high speed writing system with menu selection by pen and touch screen per claim 1 and a high speed writing device for implementation of this method per claim 22.

BACKGROUND OF THE INVENTION

Miniaturization of electronic equipment continues making great progress and offers new mobile solutions such as SMS (Short Message System) und WAP (Wireless Application Protocol). The advantages offered by this development are, however, accompanied by drawbacks such as lack of ergonomy and small, poorly arranged screens. One crucial and continuing problem is the entering of text.

Recognition of spoken language is already more advanced than recognition of handwritten text. Nevertheless, a silent form of entering text is preferable over the oral form, for respecting privacy and confidentiality e.g. in public transportation, in public places and open-plan offices.

The most popular method for entering text is by keyboard, first of all the QWERTY keyboard. Keyboards are designed for typing using the fingers. This is the main reason why the size is a minimum of appx. 24×8 cm if entering by the 10 finger system is a requirement. There is also equipment with significantly smaller QWERTY keyboards precluding practical use of the 10 finger system. This does not really make sense as better and clearer keyboard layouts exist where far shorter distances must be travelled by a single finger.

Despite the fact that more efficient and simpler to learn keyboard layouts exist, the QWERTY keyboard has become the standard (M. Helander (ed.), Handbook of Human-Computer Interaction, Elsevier (1988), pp. 475–479).

Miniature QWERTY keyboards which are equally as large and voluminous as the portable phone itself are optionally available for mobile telephony (SMS). Supplementary full size keyboards (whereby one product can be folded up) are available for palm top applications with touch screen. Keyboards of this kind are about four times the volume of the palm top set itself. An approach, as described in these examples, is opposing the idea of miniaturization and indicates the need for equipment with new methodes of entering text.

The figure keys of cellular phone keyboards are additionally occupied by three letters. One of the three letters is entered by several brief actuations of the key at short intervals. This form of entering text is reasonably space-saving but very tedious and slow. Enthusiatic SMS writers exhibit amazing readiness to achieve perfection in this form of entering data.

A very similar improved device (Nokia Mobile Phones Ltd., Salo, Finnland) demands touching of the keys only once although each key has multiple functions. By use of a stored vocabulary the device recognizes the word being typed. If a word to be entered is not stored in the vocabulary and if the device identifies several possible words the writer must choose the desired word from a menu. This step detracts from the actual writing process, or even interrupts it, if the menu does not display the desired word.

One approach to improving entering of text is by using so called touch screen monitors; because they serve the double purposes of entering and monitoring. The available area is thus put to optimum use. Devices with a touch screen monitor without keyboard represent, therefore, an interesting alternative.

There are such devices which display an on-screen keyboard (most commonly QWERTY), where individual key sections are tapped by a pen. Basically they work the same way as the palm top applications already described (PSION Computers PLC), with an actual keyboard. Even if the keyboard has been optimized for pen use (single finger system), every single character needs a "key" displayed, calling for additional screen area. Furthermore, every character must be tapped individually causing a lot of pen movement while increasing error tendency at the same time.

Several touch screen devices offer hand writing recognition. Unfortunately this feature does not work optimally. There are systems that try to anticipate entire words using extensive vocabulary. Handwriting is very frequently erroneously interpreted by the device, causing the user to be diverted from the actual writing process. There is an other system which requires entering every single letter in handwriting (capital lettering) which is quite slow. Letters need to be entered by a special 'Graffiti'-alphabet (U.S. Robotics, Palm Computing Division, Los Altos, Calif. U.S.A.). Frequent use of the Graffiti alphabet may cause alterations to the personal hand writing style. An additional problem of these devices is their demanding programming which calls for memory space and processing capacity and entails delayed display of the text entered.

When writing on paper a support is necessary and the hand must be guided which is especially cumbersome under limited space conditions. When using standard hand writing (longhand) a large number of movements must be carried out by the hand. An abbreviated writing method such as shorthand according to Stolze/Schrey (Emil Hug), Englische Stenographie, 16th. edition 1960) enables faster writing. In exchange, new characters, abbreviations of words and a shortened, orthographically incorrect, way of writing must be learnt. An equally high learning effort is required for fluent reading of shorthand.

SUMMARY OF THE INVENTION

Under U.S. Pat. No. 6,008,799 a writing system has been described that employs a touch screen. All characters and the most frequent words are shown as keys, resulting in a total of 92 keys. The keys are arranged in alphabetical order which has proved inferior to an arrangement based on frequency of use. (M. Helander (ed.), Handbook of Human-Computer Interaction, Elsevier (1988), p. 479). In addition, a vocabulary listing is also displayed. On a monitor, an area of approximately 12×20 cm is taken up, seriously limiting applications in the desk top and lap top range. As a supplement of the keys, vowels can also be entered with so-called 'flicks' or straight lines going in different directions. A great disadvantage is that only four flicks are provided (left, right, up or down). As a consequence the letter 'U' cannot be entered by a flick. Clear systematics are thus not possible. The high number of keys renders the layout cluttered and, therefore, hard to memorize. In order to actuate the proper keys the user must travel long distances with the pen which is very time-consuming. Depending on the case, the vocabulary window may need scrolling. This requires additional attention and detracts from the actual writing process. There is no provision for chaining flicks up, or inputting them in continuous sequence.

The objective of the invention is to present a method for a high speed writing system which circumvents the mentioned disadvantages.

It is another objective to describe a high speed writing device with menu selection by pen and touch screen for implementing the method. Such device is also very suitable for mobile applications.

The problem is solved by a method per claim 1 and a high speed writing device per claim 22.

BRIEF DESCRIPTION OF THE DRAWINGS

The method and the associated high speed writing device will be described below. The illustrations show.

DETAILED DESCRIPTION OF THE INVENTION

In the present invention the following terms are defined:

1. Basic Moves as a first set of pen movements of the basic kind:

Tap: Setting down and lifting the pen at the same location

Stroke: Setting down, simple or composite pen movements (without stopping) in one of the eight stroke directions and lifting the pen off Shortcut of the $1^{st}$ kind: Setting down on a key, pen movement in one of the three 'UP' directions and lifting the pen off Shortcut of the $2^{nd}$ kind: Setting down on a key, pen movement in one of the three 'UP' directions, pen movement in one of the eight stroke directions and lifting the pen off.

Double Tap: Setting down, lifting off, and setting down again on the same key (within a short time interval) and lifting the pen, or Setting down, lifting off, and setting down again on the same key (within a short time interval), carrying out any kind of pen movement and lifting the pen off.

2. Double Tap Shortcut as a second set of pen movements of a combined nature: They always start by Double Tap from the vowel field or vowel key; respectively, after which always any one key is chosen, i.e.:

Double Tap on vowel key, Double Tap on any one key, or

Double Tap on vowel key, Tap on any one key, or

Double Tap on vowel key, stroke on any one key

3. Nine-square window of the $1^{st}$ kind:

a menu window for selection. One word, letter or sequence of characters or symbols is in the center, all remaining eight are arranged in a circle around the center.

4. Nine-square window of the $2^{nd}$ kind:

a menu window for selection; it appears, triggered by a choice in the nine-square window of the $1^{st}$ kind. One word, letter or sequence of characters or symbols is in the center, all remaining eight are arranged in a circle around the center 5. Quad-square window: a menu window for selection. A word, a letter or symbol is located in the center; the remaining three are arranged above it.

6. Five-square window: a menu window for selection. A word, a letter or symbol is located in the center; the remaining four are arranged above it and one is half covered, below the square in the center.

Figure 1:
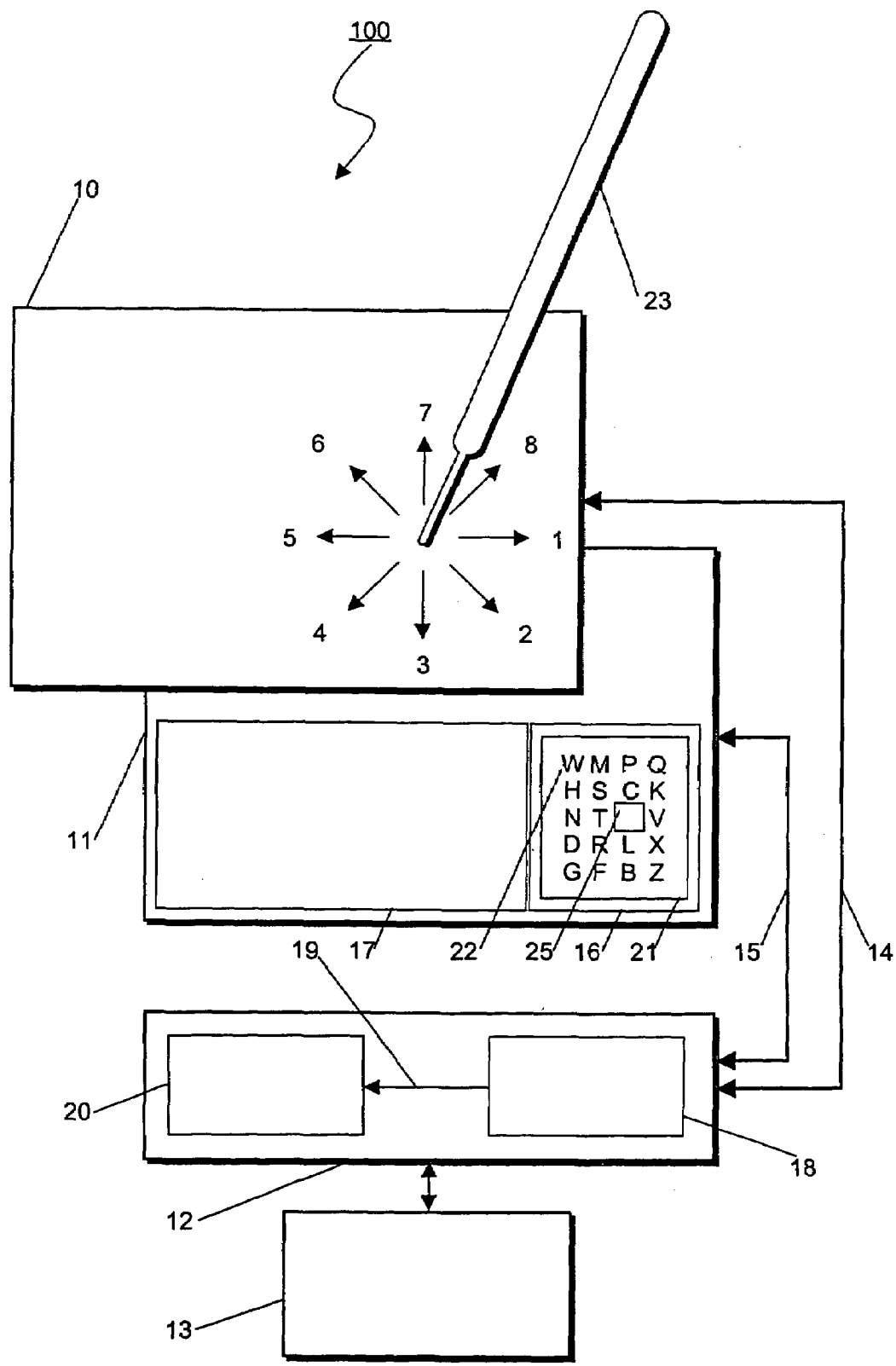
FIG. 1 Schematic structure of a high speed writing device

FIG. 1 shows a block diagram of a high speed writing device 100. An entering pad 10, a monitor 11, a processor unit 12, a memory 13 and connecting lines 14, 15 are installed in a case (not shown).

The entering pad 10, located above the monitor 11, is transparent and has a touch-sensitive entering surface provided with an entering section 16 and a text section 17. Together they form a touch screen of the known kind.

Entering section 16 and text section 17 are relocatable and of variable size. They are arranged on the touch screen in the usual window technique. The text section is located to the left of the entering section in an arrangement preferably for right-handed users.

Entering element 10 is connected to processor unit 12 by line 14; processor unit 12, in turn, is connected up to memory unit 13.

Processor unit 12 is, on the other hand, connected to monitor unit 11 (e.g. a LCD screen) by line 15, across which all informations are forwarded for image generation in text display section 17.

An entry module 18 is located in processor unit 12 which is connected by another line, line 19, to processing module 20. The internal code is transferred to the processing module via line 19.

Entering section 16 is callable and variable in size. A variable key pad 21, also variable in size, is an integral part of the entering section. This key pad is sub-divided into single keys, consonant keys 22 and a vowel key 25. An entry, such as a character, is triggered by hand guided pen 23, selecting one of the keys 22, 25.

Furthermore, pen movements in eight selected, or preferred, stroke directions 1, 2, . . . , 8 whose functions will be gone into later on.

The x/y coordinates of the contact point of pen and touch screen are forwarded to processor unit 12 via line 14. Lines 14 and 15, as well as line 19, may also be configured as bi-directional lines.

The characters generated are displayed in text section 17. In the absence of a text section they are directly processed in processor unit 12 and stored in memory 13. Text section 17 may be missing if tight space conditions do not allow for it, e.g. if the high speed writing device is integrated in a watch, as an example of execution, as described later.

Pen 23 has a rounded tip and does not permit actual writing. It serves the purpose of selecting keys, or of calling up sections on the touch screen, and of carrying out pen movements.

A software implemented in processor unit 12 is required for all processing of the entries carried out by the pen in the key section.

Figure 2:
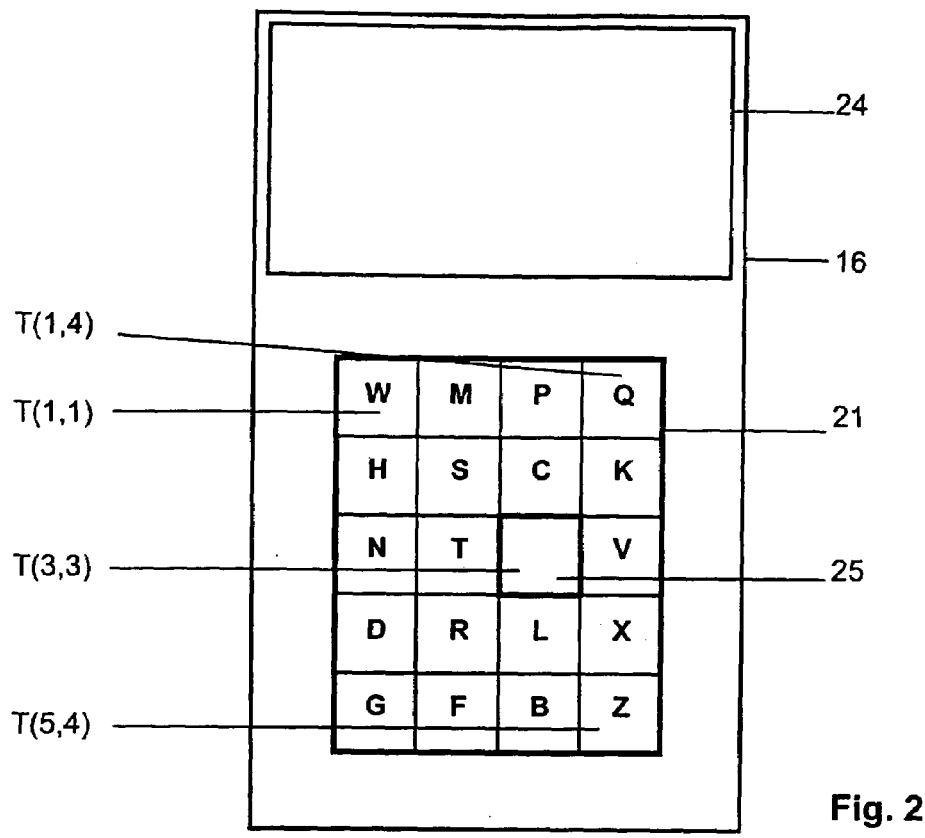
FIG. 2 Representation of an entry pad with one possible frequency distribution of the consonants for English FIG. 3 Representation of an entry pad with one possible frequency distribution of the consonants for German FIG. 4 Line orientation of the vowel key with allocations FIGS. 5A–5N Key pads with various word examples FIGS. 6A–6D Sequence of entries in English FIG. 7 Table with double taps and shortcuts of the $1^{st}$ kind FIG. 8 Table with double tap shortcuts FIG. 9 Table for entering figures FIGS. 10A–10B Tables with a menu window originating from the vowel key FIGS. 11A–11B Tables with a menu window originating from the P key FIG. 12 Tables with a menu window originating from the F key FIG. 13 Flow chart for the entry module FIG. 14 Flow chart for the processing module FIGS. 15–21 Further flow charts for the processing module FIG. 22 Example of a pen FIG. 23A First example of a 'Palmtop' implementation FIG. 23B Second example of a 'Palmtop' implementation with swing-out cover FIG. 23C Third example of a 'Palmtop': 'Palmtop' hinge arranged at an angle FIG. 24 Example of implementation in 'watch' style FIG. 25A First example of implementation in a laptop PC FIG. 25B Second example of implementation in a laptop PC

FIG. 2 represents an entry pad with a key section featuring one of the possible frequency distributions of consonants for the English language.

Entry section 16 is sub-divided into 6×7, usually square-shaped, cells, 4×5 of which define key section 21, whereby the key section is centered such that a row, or a column, respectively, of free cells is provided.

Key section 21 is sub-divided into character keys, and T(I,K), respectively, whereby I signifies the rows, and K signifies the columns of the key section. Key T(3,3) is a so-called vowel key 25 the function of which shall be described later. The consonants have been assigned keys T(1,1) to T(5,4) in such a manner as, to arrange frequently used consonants centrally and less frequently, or rarely, used consonants mainly at the periphery. As an example, rare consonants W and Z are located on keys T(1,1) and T(5,4). The arrangement shown here is one of many possible arrangements taking into account the frequency distribution of consonants. These arrangements are specific to each language.

Sub-division of the entry section into 6×7 square cells is provided for allocation of the keys to given x/y coordinates. A special key section 24, for special signs, such as punctuation and others, may be located beside key section 6.

Figure 3:
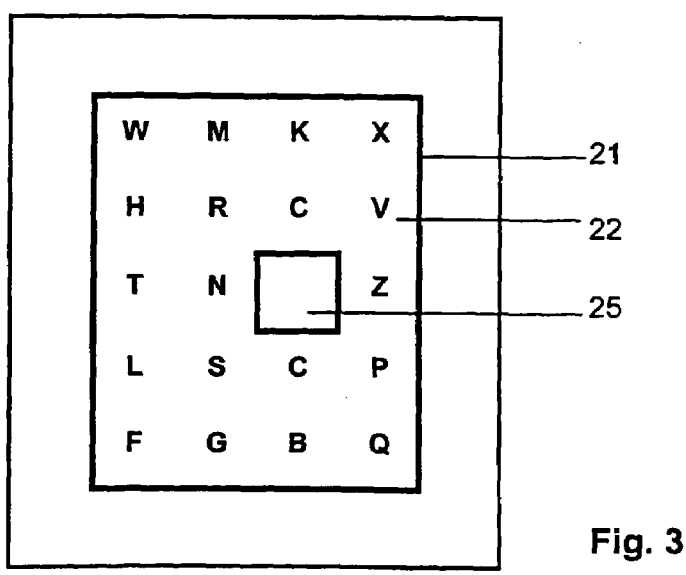

FIG. 3 represents an entry section with a key section featuring one of the possible frequency distributions of consonants for the German language.

Shown again are key T(3,3) as vowel key 25, surrounded by 19 consonant keys 22. The consonant arrangement again meets the same condition as in FIG. 2, namely to ensure the shortest possible distances to the most frequent consonants.

Figure 4:
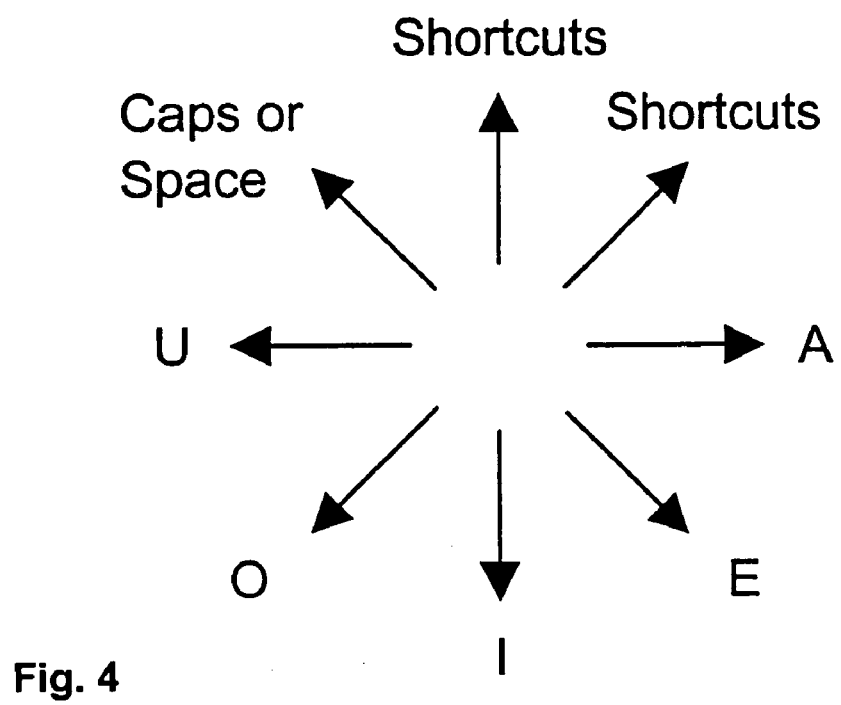

FIG. 4 shows eight stroke directions originating from any one of the twenty keys. Five of them have been assigned vowels A, E, I, O, U and three are especially distinguished stroke directions. Stroke durection 'up' is provided for l (L) and j if executed directly following a vowel generating stroke. If executed immediately after touching any one of the twenty keys, a so-called 'extension' is carried out; m becomes 'mp', n becomes 'nd', s becomes 'sh'. Stroke direction 'right-up' is provided for r if executed directly following a vowel generating stroke. If executed immediately after touching any one of the twenty keys, an 'extension' is carried out; c becomes 'can_', l becomes 'last_', w becomes 'was_' ('_' means space). Stroke direction 'left-up' initiates capital lettering if executed directly after touching the vowel key followed by a vowel generating stroke, or if executed immediately after touching one of the consonant keys (see also FIG. 7). If stroke direction 'left-up' is executed as last movement of a stroke or immediately following touching the vowel key, a space is generated. These stroke directions are intended for pen movements of 2–8 millimeters in length, as described later.

The basics of the high speed writing system shall be explained by a first choice of operational directions Strokes starting on a consonant key have an influence on that consonant or attach vowels to it.

When the vowel key is touched, a vowel is written.

A word must be completed by a 'left-up' stroke (space).

For any combination of lines, the start key only is of importance. Keys that will be crossed over along the way have no bearing.

Tap (l) writes the selected consonant singly and without alteration.

A word started by a 'left-up' stroke is written in capital letters.

'Tap' and 'Stroke', both of them belonging to the 'Basic Moves', will generate letters or letter sequences, i.e. syllables, respectively, as illustrated by the following simple examples:

Setting the pen down on a consonant key and lifting it off again makes the tapped/selected consonant appear on the screen. This is an input acknowledgement since the entry can be verified in the text section. This acknowledgement is not a necessity, however. It is essential that the input be processed by the processor provided, then stored in memory.

Setting the pen down on the vowel key, then carrying out a pen stroke in one of the stroke directions for vowels A, . . . , U then lifting it off will generate the entry of the tapped/selected vowel.

Setting the pen down on a consonant key, then carrying out a pen stroke in one of the stroke directions for vowels A, . . . , U then lifting it off will generate the entry of the tapped/selected consonant, followed by the respective vowel.

Figure 5A:
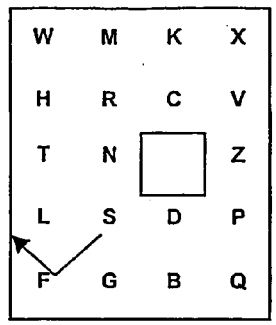

The word 'so', followed by a space, will therefore be written as follows:

Set pen down on 'S',
   carry out pen movement 'left-down' (o),
   carry out pen movement 'left-up' (space)
   and lift pen off (FIG. 5A).

Figure 5B:
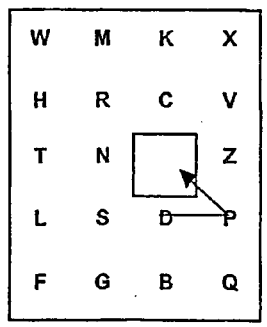

Here is how to write the word 'be', followed by a space:
Set pen down on 'B',
   stroke 'right-down' (e),
   stroke 'left-up' (space)
   and lift pen off (FIG. 5B).

Here is how to write the word 'comes':
Set pen down on 'C',
   stroke 'left-down' (o), and lift off;
Set pen down on 'M',
   stroke 'right-down' (e) and lift off;
Set pen down on 'S',
   stroke 'left-up' (space)
   and lift pen off (FIG. 5C).

Figure 5C:
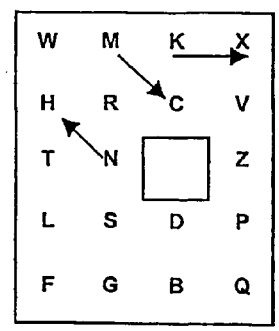

FIG. 5C shows a key section with stroke directions for the pen movements generating the word 'comes'. Besides the first stroke 'left-down' for part 'co' and a second stroke 'right-down' for part 'me', a third stroke, 'left-up', will be noticed that will generate a space at the end of the word.

Figure 5D:
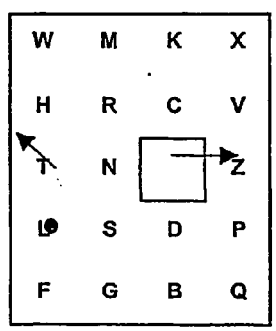

Here is how to write the word 'old':
Set pen down on vowel key,
   stroke 'left-down' (o) and lift off;
Set pen down on 'L' and lift off ('tap');
Set pen down on 'D',
   stroke 'left-up' (space)
   and lift pen off (FIG. 5D).

Figure 5E:
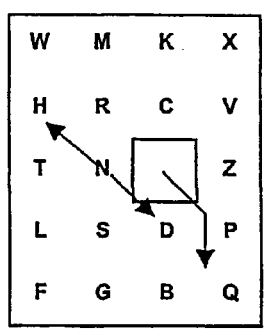
Figure 5F:
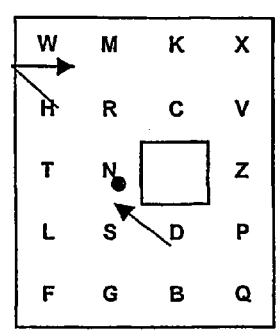
Figure 5G:
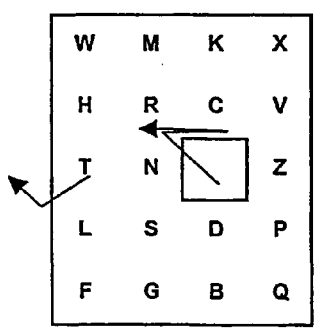

Here is how to write the word 'goal':
Set pen down on 'G',
   stroke 'left-down' (o),
   stroke 'right' (u) and lift off;

Set pen down on 'L',
   stroke 'left-up' (space)
   and lift off (FIG. 5E).
Here is how to write the word 'Zurich':
Set pen down on 'Z',
   stroke 'left-up' (for capital letter),
   stroke 'left' (u) and lift off;
Set pen down on 'R',
   stroke 'down' (i) and lift off;
Set pen down on 'C' and lift off ('tap');
Set pen down on 'H',
   stroke 'left-up' (space)
   and lift off again (FIG. 5F).
Here is how to write the word 'Europe':
Set pen down on vowel key,
   stroke 'left-up' (for capital letter),
   stroke 'right-down' (e),
   stroke 'left' (u) and lift off;
Set pen down on 'R',
   stroke 'left-down' (o) and lift off;
Set pen down on 'P',
   stroke 'right-down' (e),
   stroke 'left-up' (space)
   and lift off (FIG. 5G).

Setting the pen down on a key, moving it in one of three 'UP' directions and lifting it off again generates a 'shortcut of the $1^{st}$ kind' the total number of which is 20*3. 'UP' in capital letters stands here for 'up-right', 'up', and 'up-left'.

Setting the pen down on a key, moving it in one of three 'UP' directions, followed by a stroke in one of the eight directions generates a 'shortcut of the $2^{nd}$ kind' the total number of wich is 20*3*8.

Setting the pen down on a key, lifting it off again, and setting it down again on the same key after a very short time (typically 0.3 seconds) generates a 'Double Tap'.

FIG. 7 shows a chart with Double Taps und Shortcuts of the $1^{st}$ kind. The top line shows the columns below titled 'Key', 'Double tap' and with three stroke directions. All pen movements belonging to this chart are carried out starting from either a consonant key or the vowel key.

Gaps, or vacant spots of this chart are at the individual disposal and may be filled in with the most frequent personal words.

Actuating a double tap on a consonant key will double up the corresponding con-sonant, generate a special symbol, or a word according to the fourth column from the right (FIG. 7).

Setting the pen down on a consonant key, followed by stroke 'left-up' and lifting it off again, will cause the selected consonant to become a capital letter according to the third column from the right (FIG. 7).

Setting the pen down on a consonant key, followed by stroke 'up' and lifting it off again, will generate a letter sequence or a word according to the second column from the right (FIG. 7).

Setting the pen down on a consonant key, followed by stroke 'right-up' and lifting it off again, will generate a letter sequence or a word according to the first column from the right (FIG. 7).

Setting the pen down on the vowel key, followed by a stroke in one ot the three stroke directions, and lifting it off again, will execute functions such as 'SPACE', 'BACK SPACE', or 'DELETE'.

Setting the pen down on the vowel key, followed by Double Tap (shaded square), will start the 'Double Tap Shortcut'; following this, a Tap, Double Tap, or a pen movement in one of the stroke directions, will be carried out on any one key.

Executing a Double Tap on the 'X' key (shaded square) will cause a menu window to appear with an EXIT key, a figure key and four selectable windows for student tutoring. Selecting the X key is not an absolute necessity. It is of the essence to select a key rarely used which is, no doubt, the case for 'X'.

A Double Tap (ll) on a consonant key will either double or extend it; b becomes bb, c becomes ch, and k becomes ck.

Figure 5H:
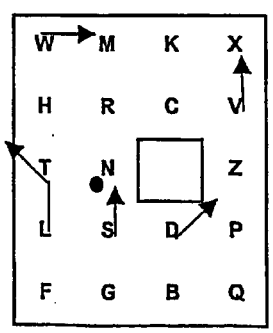
Figure 5J:
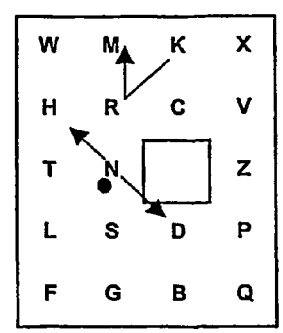
Figure 5K:
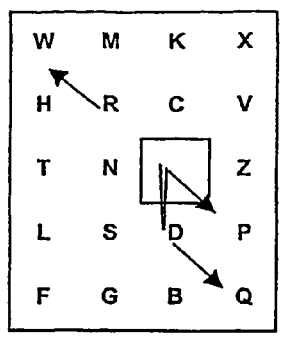
Figure 5L:
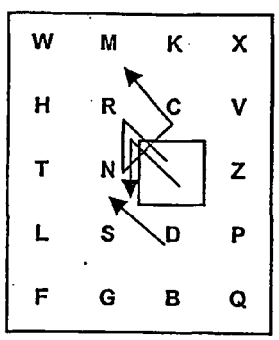
Figure 5M:
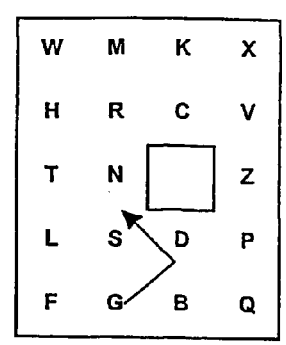
Figure 5N:
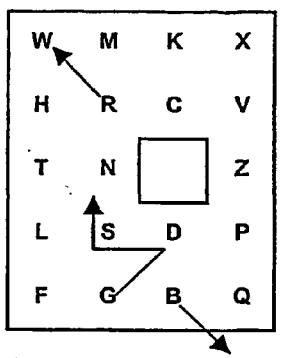

The word 'song', followed by a space, will therefore be written as follows:
Set pen down with 'S',
   carry out pen movement 'left-down' (o),
double tap on 'G' (ng),
   carry out pen movement 'left-up' (space)
   and lift pen off (FIG. 5H).
Here is how to write the word 'thunderbolt':
Set pen down on 'T',
   stroke 'up' (th),
   stroke 'left' (u) and lift pen off;
Set pen down on 'N',
   stroke 'up' (nd),
   stroke 'right-down' (e),
   stroke 'right-up' (r) and lift pen off;
Set pen down on 'B',
   stroke 'left-down' (o),
   stroke 'up' (l) and lift pen off;
Set pen down on 'T',
   stroke 'left-up' (space)
   and lift pen off (FIG. 5J).
Here is how to write the word 'jump':
Set pen down on vowel key,
   stroke 'down',
   stroke 'up' (j),
   stroke 'left' (u), and lift pen off;
Set pen down on 'M',
   stroke 'up' (p),
   stroke 'left-up' (space),
   and lift pen off (FIG. 5K).
Here is how to write the word 'June':
Set pen down on the vowel key,
   stroke 'left-up' ('caps'),
   stroke 'down', stroke 'up' (J),
   stroke 'left' (u) and lift pen off;
Set pen down on 'N',
   stroke 'right-down' (e),
   stroke 'left-up' (space)
   and lift pen off FIG. 5L).
Here is how to write the word 'has', followed by a space:
Set pen down on 'H',
stroke 'up' ('shortcut')
and lift pen off (FIG. 5M)
Here is how to write the word 'have', followed by a space:
Set pen down on 'H',
stroke 'up', stroke 'right-up'
and lift pen off (FIG. 5N).

FIGS. 6A–6D show a connected sequence of entries. This shall explain how the sentence 'he is walking' appears in the text section.

Figure 6A:
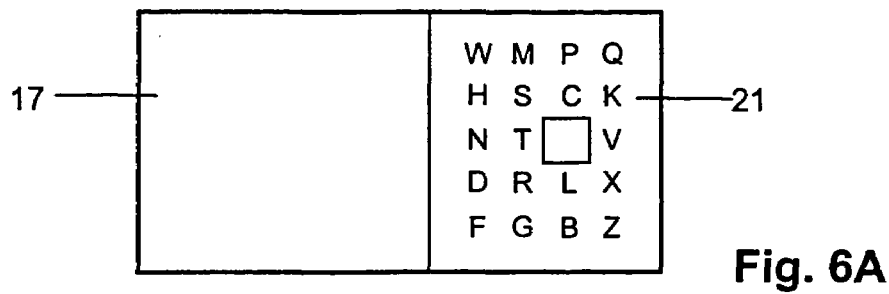

FIG. 6A shows entry section 16 and text section 17 beside it, as part of a monitor, or of an entry area. The consonants of the entry section have been arranged around the vowel key according to their frequency of use in the Englsh language.

Figure 6B:
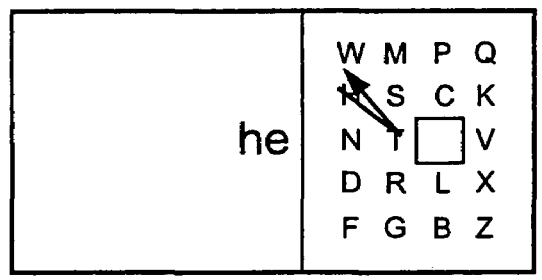

FIG. 6B shows entering by the pen starting on H key followed by strokes 'right-down', then 'left-up'. This sequence will generate and display, the word 'he' followed by a space, in the text section.

Figure 6C:
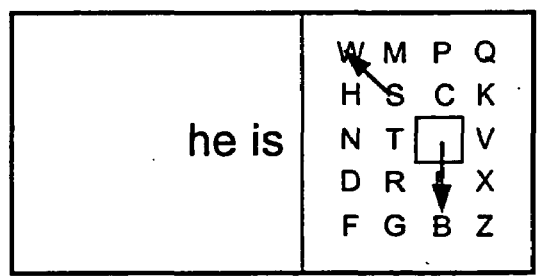

FIG. 6C shows the subsequent entry by the pen starting on the vowel key with stroke 'down', lifting off, then setting pen down on S with stroke 'left-up'. This sequence will generate and display the word 'is' in the text section.

Figure 6D:
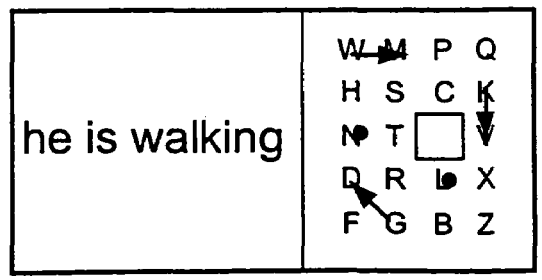

FIG. 6D shows the subsequent entry by the pen starting on W key followed by strokes 'right', lifting off, then setting pen down on K key with stroke 'down', lifting off, then double tap G key, then stroke 'left-up'. This sequence will generate and display the word 'walking' in the text section.

Figure 8:
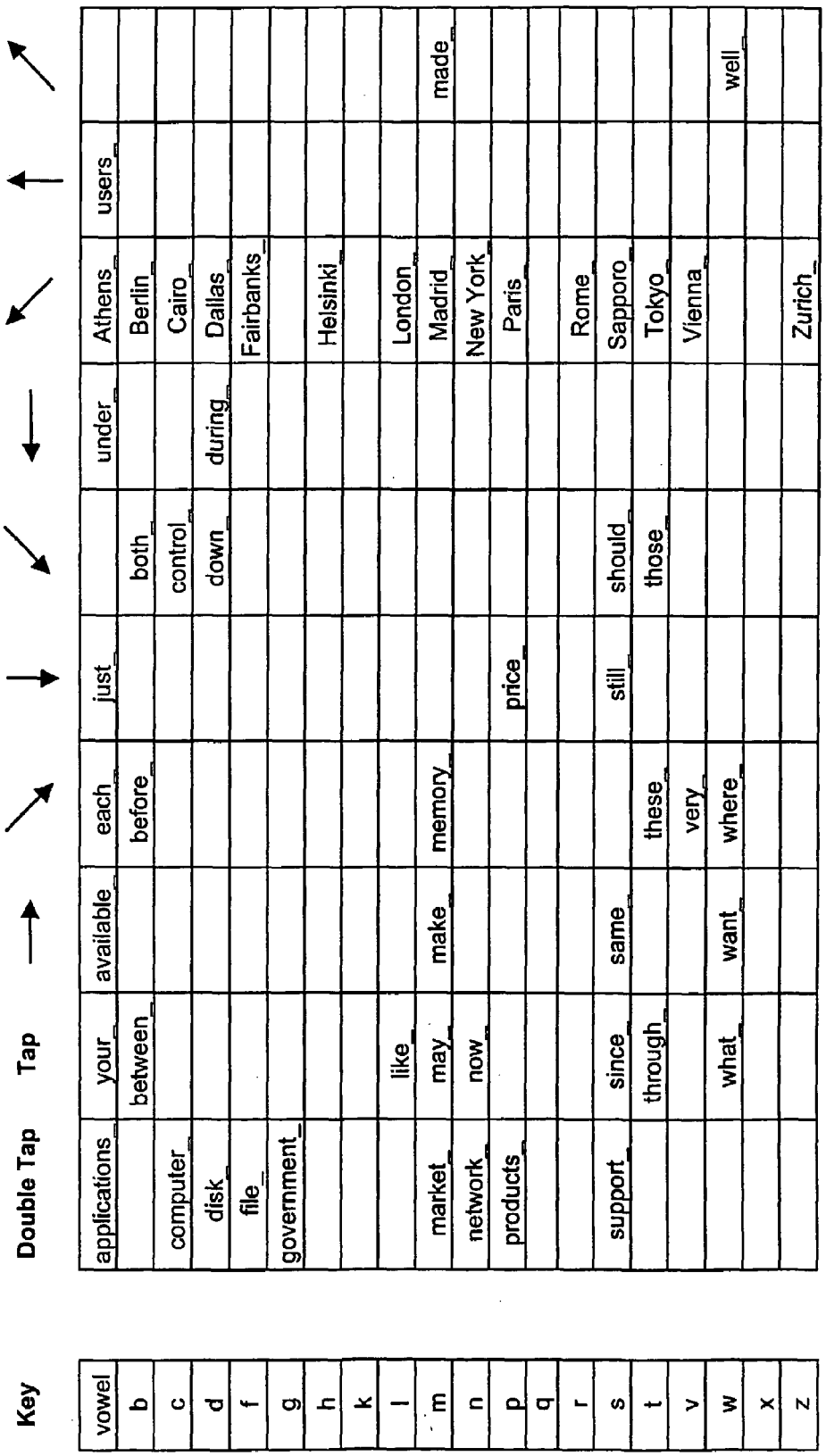

FIG. 8 shows a chart with double tap shortcuts. The top line shows the columns below titled 'Key', 'Double Tap' 'Tab' and with eight stroke directions. All pen movements belonging to this chart are carried out starting with Double Tap from the vowel key, followed by:

a Double Tap on any one key, or
a Tap on any one key, or
a Stroke on any one key.

The words allready filled in may be changed by the user. The gaps, or open locations of this chart are, again at the individual disposal and may be filled in with the most frequent personal words.

Executing a Double Tap on the bowel key followed by Double Tap of any one key will generate words in accordance with the tenth column from the right (FIG. 8).

For example, Double Tap on the vowel key followed by Double Tap on C key will generate the word 'computer_', followed by a space.

Executing a Double Tap on the vowel key followed by Tap on any one key will generate the words in accordance with the ninth column from the right (FIG. 8).

For example, Double Tap on the vowel key followed by Tap on T key will generate the word 'trough_'.

Executing a Double Tap on the vowel key followed by a Stroke will generate words in accordance with the first to eight columns from the right (FIG. 8).

For example, Double Tap on the vowel key followed by stroke 'left-up' from Z key will generate the word 'Zurich_'.

Or, Double Tap on the vowel key followed by Stroke 'right' from the vowel key will generate the word 'available'.

It follows that a total of 20*10 words are programmable under the 'Double Tap shortcuts' function.

Figure 9:
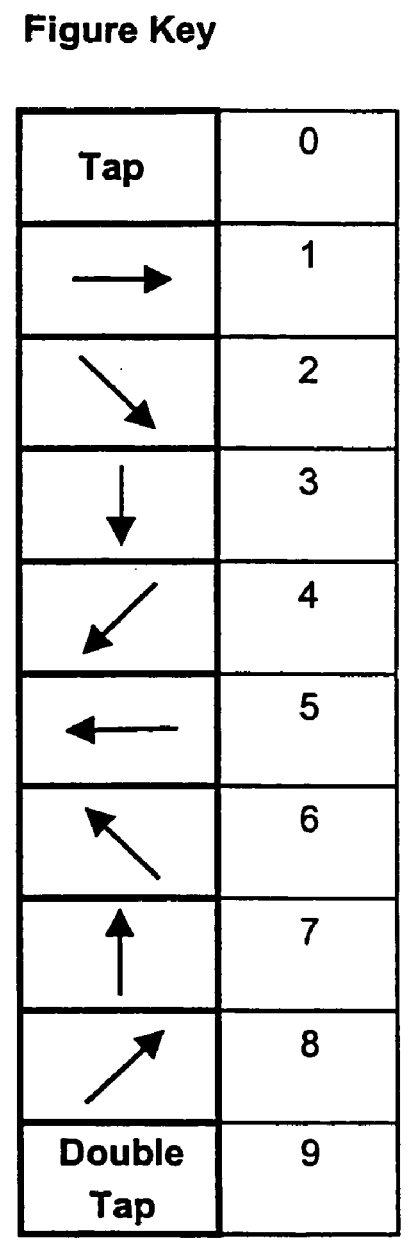

FIG. 9 shows a chart with pen movements along with their assignments to numerals 0 to 9. Executing a Tap on the number key will generate numeral '0'. Executing a 'right' stroke will generate numeral '1'. Numerals 2 to 8 are generated in similar fashion. Executing a Double Tap on the number key generates the numeral '9'.

FIG. 10A shows nine menu windows that belong to the vowel key. They are presented on the monitor one by one, only. They are tutoring programs for as long as the user does not know the various meanings of the eight strokes and of their combinations. The menu windows shown here represent the maximum degree of assistance.

A nine-square window of the $1^{st}$ kind is located in the center with eight associated nine-square windows arranged around. The periphery of the nine-square window of the $1^{st}$ kind consists of eight double-framed keys. Each of the eight nine-square windows of the $2^{nd}$ kind features a double-framed key in the center.

Setting the pen down on the vowel key will call for the nine-square window shown here to appear on the monitor. Being centered over the vowel key it covers up the key section. The ENTER key is located in the center of this nine-square window. It is selected by lifting the key off without stroke. Making pen strokes in any one of the eight stroke directions triggers a selection in this menu window of the $1^{st}$ kind. If, as an example, stroke 'right-up' is carried out (selecting double-framed DELETE key) the window with the DELETE key in the center will appear. Being centered over the DELETE key it covers up the key section. Lifting the pen off without stroke will select and execute DELETE. Leaving the pen on the surface and making stroke 'left' (select 'and_' key) will generate the word 'and' followed by a space.

Figure 10B:
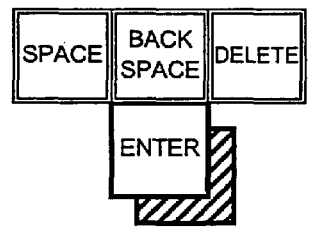

FIG. 10B shows four menu windows that belong to the vowel key. They are presented on the monitor one by one, only. They are tutoring programs for as long as the user does not know all the various meanings of the eight strokes and of their combinations. The menu windows shown here provide a medium degree of assistance. The user is familiar with the five vowel-generating strokes.

A five-square window is located in the center with four associated nine-square windows of the $2^{nd}$ kind arranged above. The shaded, partly covered key symbolizes the access to the double tap shortcuts. Setting the pen down on the vowel key, followed by double tap, will start the 'double tap shortcut'; following this, a tap, double tap, or a pen movement in one of the stroke directions, will be carried out on any one key. The periphery of the nine-square window consists of eight double-framed keys. Each of the nine-square windows features a double-framed key in the center.

Setting the pen down on the vowel key will call for the five-square window shown here to appear on the monitor. Being centered over the vowel key it covers up the key section. The ENTER key is located in the center of this five-square window. It is selected by lifting the key off without stroke. Making pen strokes in any one of the three 'UP'-stroke directions triggers a selection in this menu window of the $1^{st}$ kind. If, as an example, stroke 'right-up' is carried out (selecting double-framed DELETE key) the window with the DELETE key in the center will appear. Being centered over the DELETE key it covers up the key section. Lifting the pen off without stroke will select and execute DELETE. Leaving the pen on the surface and making stroke 'right' (select 'also_' key) will generate the word 'also' followed by a space.

Figure 11A:
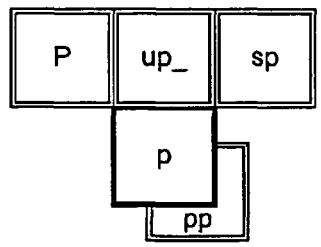

FIG. 11A shows five menu windows that belong to the P key. They are presented on the monitor one by one, only. They are tutoring programs for as long as the user does not know all the various meanings of the eight strokes and of their combinations. The menu windows shown here provide a medium degree of assistance. The user is familiar with the five vowel-generating strokes.

A five-square window is located in the center with four associated windows arranged around. The periphery of the five-square window consists of four double-framed keys. Each of the four windows of the $2^{nd}$ kind features a double-framed key in the center.

Setting the pen down on the P key will call for the five-square window shown here to appear on the monitor. Being centered over the P key it covers up the key section. The 'p' key is located in the center of this five-square window. It is selected by lifting the key off without stroke. Making pen strokes in any one of the three 'UP'-stroke directions triggers a selection in this menu window of the $1^{st}$ kind. If, as an example, stroke 'right-up' is carried out (selecting double-framed 'sp' key) the window with the 'sp' key in the center will appear. Being centered over the 'sp' key it covers up the key section. Lifting the pen off without stroke will select and generate 'sp'. Leaving the pen on the surface and making stroke 'left-down' (select 'spo' key) will generate the letter sequence 'spo'.

Figure 11B:
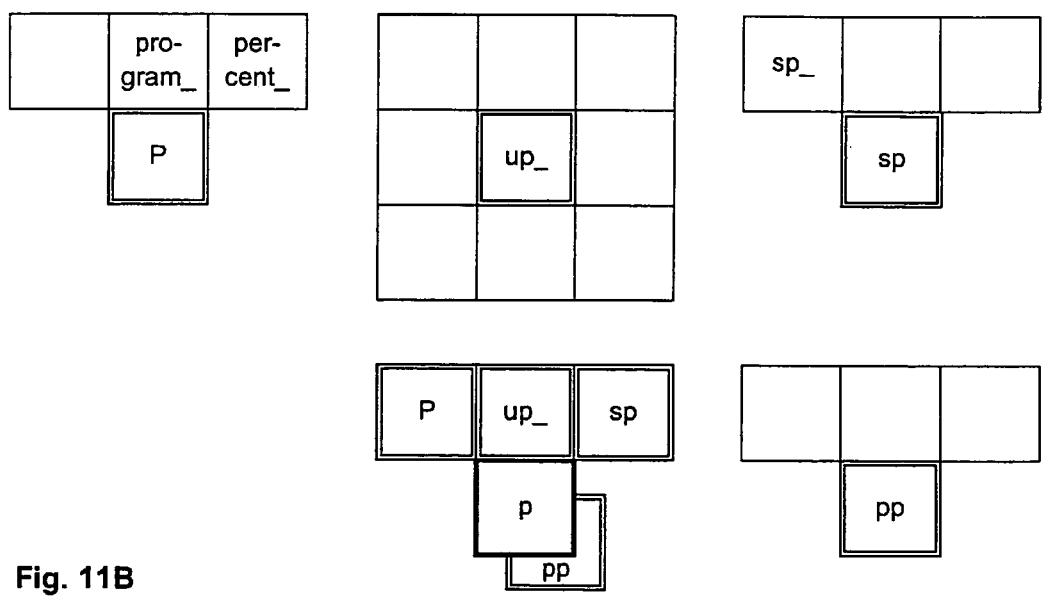

FIG. 11B shows five menu windows that belong to the P key. They are presented on the monitor one by one, only. They are tutoring programs for as long as the user does not know all the various meanings of the eight strokes and of their combinations. The menu windows shown here provide a minimum degree of assistance. The user is familiar with the five vowel-generating strokes. The user is familiar with the basic meaning of the eight stroke directions.

A five-square window is located in the center with four associated windows arranged around. The periphery of the five-square window consists of four double-framed keys. Each of the four windows of the $2^{nd}$ kind features a double-framed key in the center.

Executing a Double Tap, e.g., on the P key will let the four-square window shown here appear on the monitor. Being centered over the P key it covers up the key section. The 'pp' key is located in the center of this four-square window It is selected by lifting off the pen without a stroke. Making pen strokes in any one of the three 'UP'-stroke directions triggers a selection in this menu window of the $1^{st}$ kind. If, as an example, stroke 'up' is carried out (selecting vacant key) the window with the vacant key in the center will appear. Lifting the pen off without stroke will select a word hitherto undefined.

The letters (or letter sequences) 'P', 'sp' and 'pp' are frequently followed by vowels. For this reason the vowel-generating strokes are not available to generate words from the respective menu windows. In this case the vowel-generating strokes have already been assigned letter combinations such as e.g. 'spa', 'spo', 'ppe' or 'ppi'.

Figure 12:
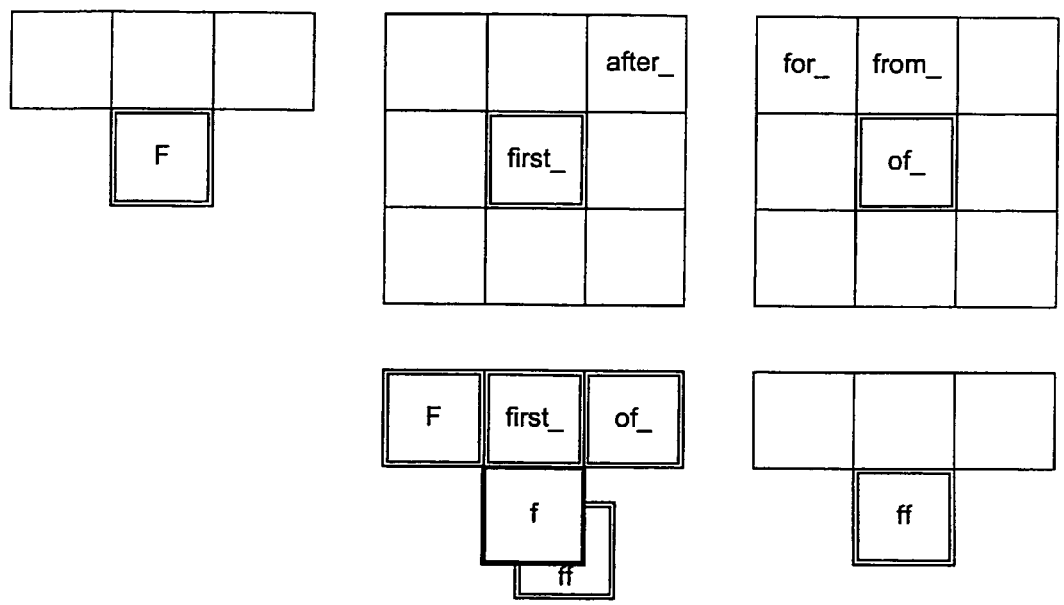

FIG. 12 shows five menu windows that belong to the F key. They are presented on the monitor one by one, only. They are tutoring programs for as long as the user does not know all the various meanings of the eight strokes and of their combinations. The menu windows shown here provide a minimum degree of assistance. The user is familiar with the five vowel-generating strokes. The user is familiar with the basic meaning of the eight stroke directions.

A five-square window is located in the center with four associated windows arranged around. The periphery of the five-square window consists of four double-framed keys. Each of the four windows of the $2^{nd}$ kind features a double-framed key in the center.

Setting the pen down on the F key will call for the five-square window shown here to appear on the monitor. Being centered over the F key it covers up the key section. The 'f' key is located in the center of this five-square window. It is selected by lifting the key off without stroke. Making pen strokes in any one of the three 'UP'-stroke directions triggers a selection in this menu window of the $1^{st}$ kind. If, as an example, stroke 'up' is carried out (selecting double-framed 'first_' key) the window with the 'first_' key in the center will appear. Being centered over the 'first_' key it covers up the key section. Lifting the pen off without stroke will select and generate the word 'first_'. Leaving the pen on the surface and making stroke 'right-up' (select 'after_' key) will generate the word 'after' followed by a space.

Executing a Double Tap, e.g., on the F key will let the four-square window shown here appear on the monitor. Being centered over the F key it covers up the key section. The 'ff' key is located in the center of this four-square window It is selected by lifting off the pen without a stroke. Making pen strokes in any one of the three 'UP'-stroke directions triggers a selection in this menu window of the $2^{nd}$ kind. If, as an example, stroke 'left-up' is carried out (selecting vacant key) the window with the vacant key in the center will appear. Lifting the pen off without stroke will select a word hitherto undefined.

The method shall be explained further by means of flow charts in what follows.

Figure 13:
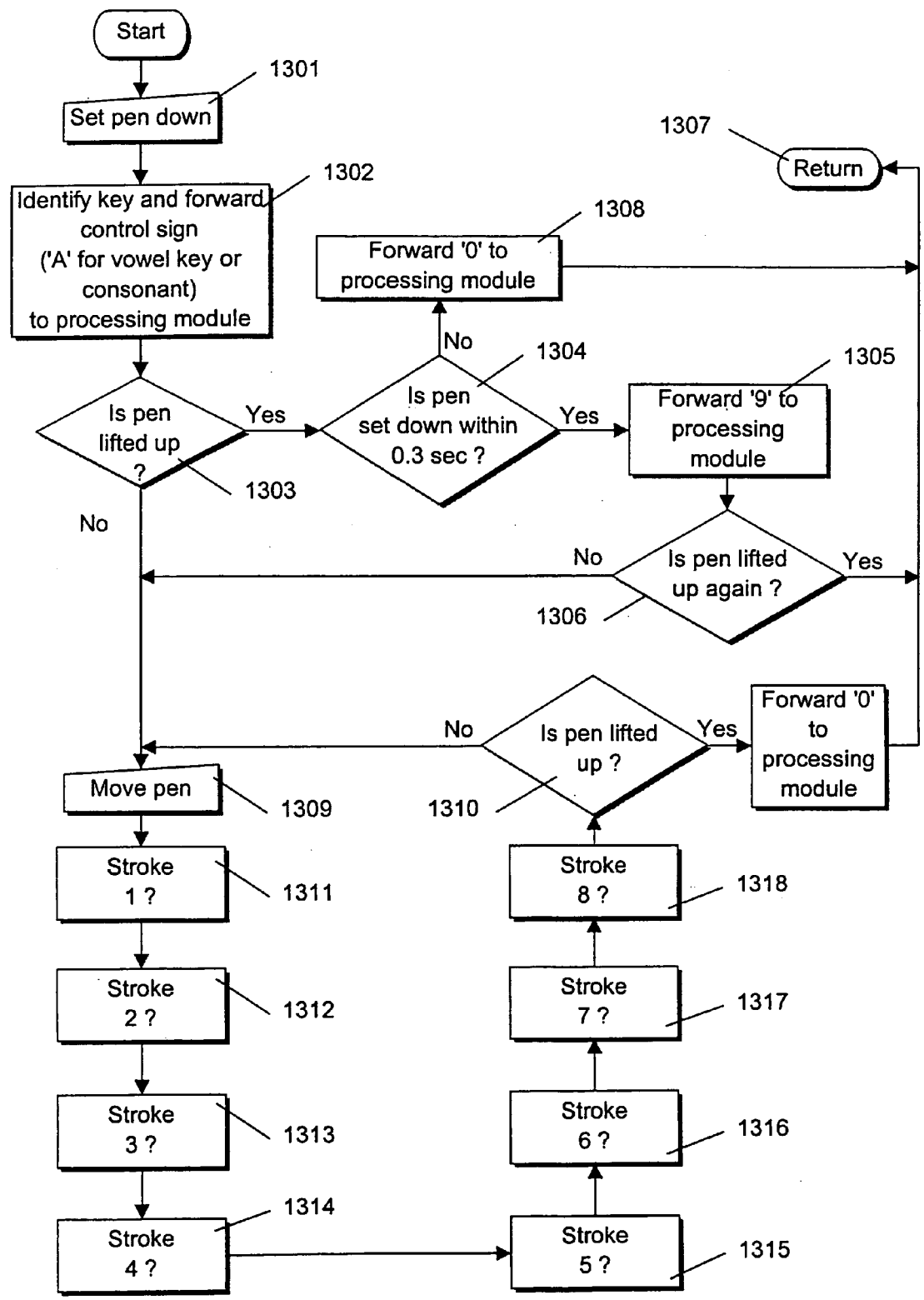

FIG. 13 shows a flow chart for the entry module. In the entry module the keys selected and the pen movements originating therefrom (Tap, Double Tap and Strokes) are identified. A program loop allows the pen to be guided freely while providing identification and sequential combination of the respective vowels and functions.

The entry module basically analyzes the pen movements and translates them into a standardized internal code. The individual signs of this code are one-place. Pen movements such as Tap, stroke directions, and Double Tap have been assigned numbers 0 to 9. Menu windows selected are assigned the consonant shown on the respective key. Letter 'A' has been assigned to the vowel key.

The internal code consists of 30 control signs. Each control sign identified is immediately forwarded to the processing module where it is inserted in its respective location in the program flow. The processing module ensures correct interpretation of single or combined code signs and generation of the corresponding letter or combination of letters. The following example illustrates how a text entered is translated into internal code:
Touch_screen_devices_are_ENTER
an_interesting_alternative_ ('_' means space)
P
T6450C0C60S0C0R220N60D20V30C20S60A18260A0
A10N60A20N0T2820S830G0G60A10L0T280N10T20V260

The entry module forwards the code to the processing module where it is translated back to the original text.

This section of the program starts with setting the pen down (Step 1301) whereby the x/y coordinates of the contact point on the entry surface are generated. Step 1302 identifies the key and forwards the pertinent information, i.e. a one-place sign (letter), to the processing module which is also a part of the central processor.

Step 1303 verifies whether the pen has been lifted off. If the answer is 'Yes', step 1304 then carries out verification whether the pen was set down again within 0.3 seconds. If 'Yes', control sign '9' is clearly identified and forwarded as information to the processing module (step 1305). Subsequently, step 1306 verifies whether the pen has been lifted off. If 'Yes' (a Double Tap has been executed) the program segment ends by 'Return' (step 1307), taking the program back to the starting point.

If the answer in step 1304 was 'No' (a Tap has been executed), this signifies control sign '0' which is forwarded as information to the processing module (step 1308), whereupon the program segment ends by 'Return' (step 1307); cf. also FIG. 9.

If the answer in step 1306 is 'No', pen movement (step 1309) is carried on. Step 1311 then identifies stroke direction '1', i.e. when the pen is moved 'right', this movement is assigned stroke direction '1' and the corresponding information, or the control sign, respectively, is forwarded to the processing module. Continuation is by step 1312. Stroke directions '2' to '8' are similarly identified by steps 1312 to 1318 and the respective informations are then forwarded to the processing module.

Step 1310 carries out verification whether the pen was lifted off the surface. If 'Yes' the program segment ends by 'Return' (step 1307), taking the program back to the starting point. If the answer in step 1310 is 'No', continuation is by step 1309.

Figure 14:
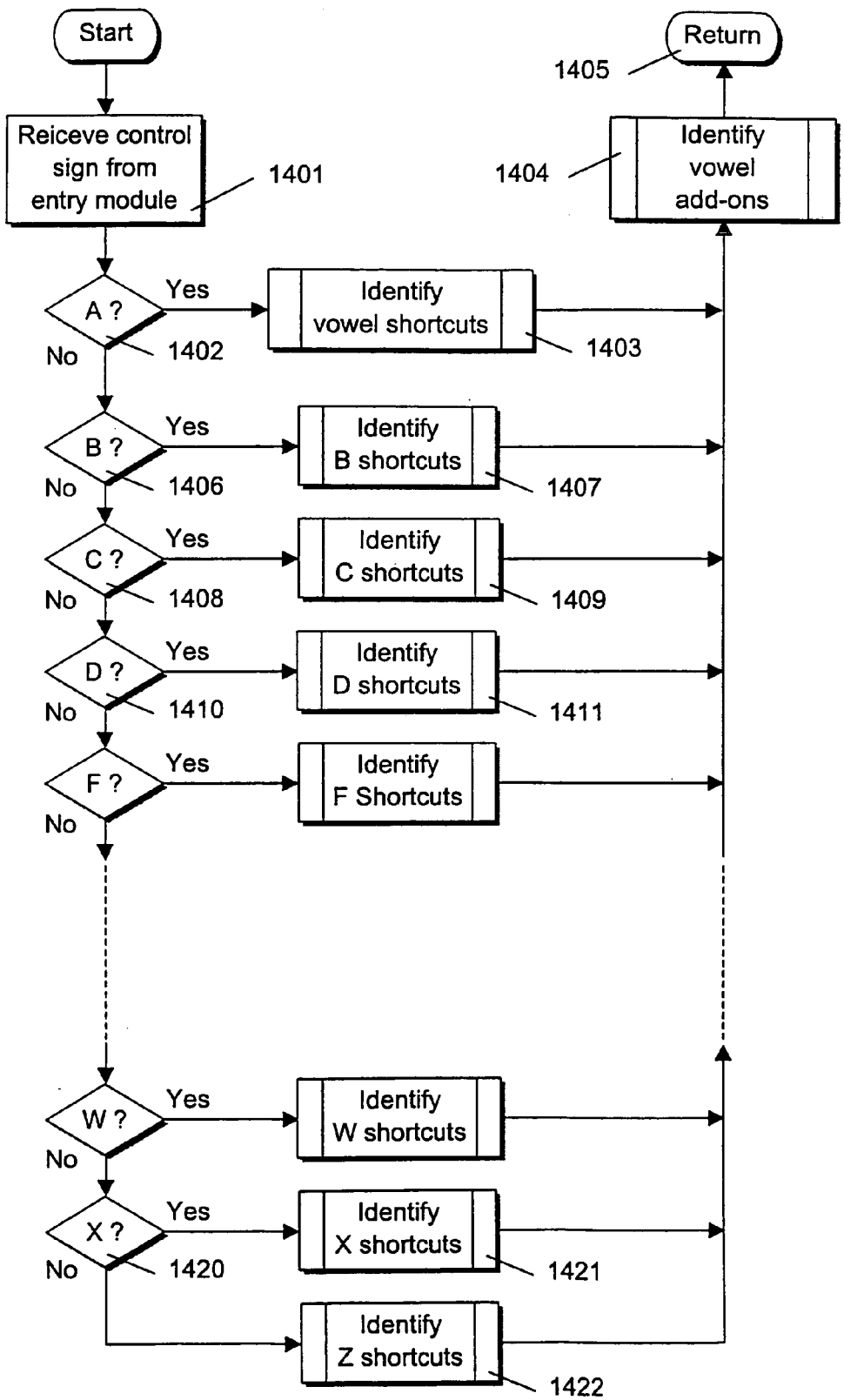

FIG. 14 shows a flow chart as an outline for the processing module with indications pertaining to related further flow charts.

Control signs generated in the entry module are read and processed by the processing module. Processing of control signs is started when a control sign is received from the entry module (step 1401).

Next step, 1402, carries out verification whether the control sign is 'A'. If 'Yes', step 1403 will identify the vowel shortcuts, as described by flow chart in FIG. 16.

If menu windows are to be displayed, these will be triggered between steps 1402 and 1403. Thus, e.g. a nine-square window (FIG. 10A) or the five-square window (FIG. 10B), will show up in the case where the medium degree of tutoring has been selected.

Figure 21:
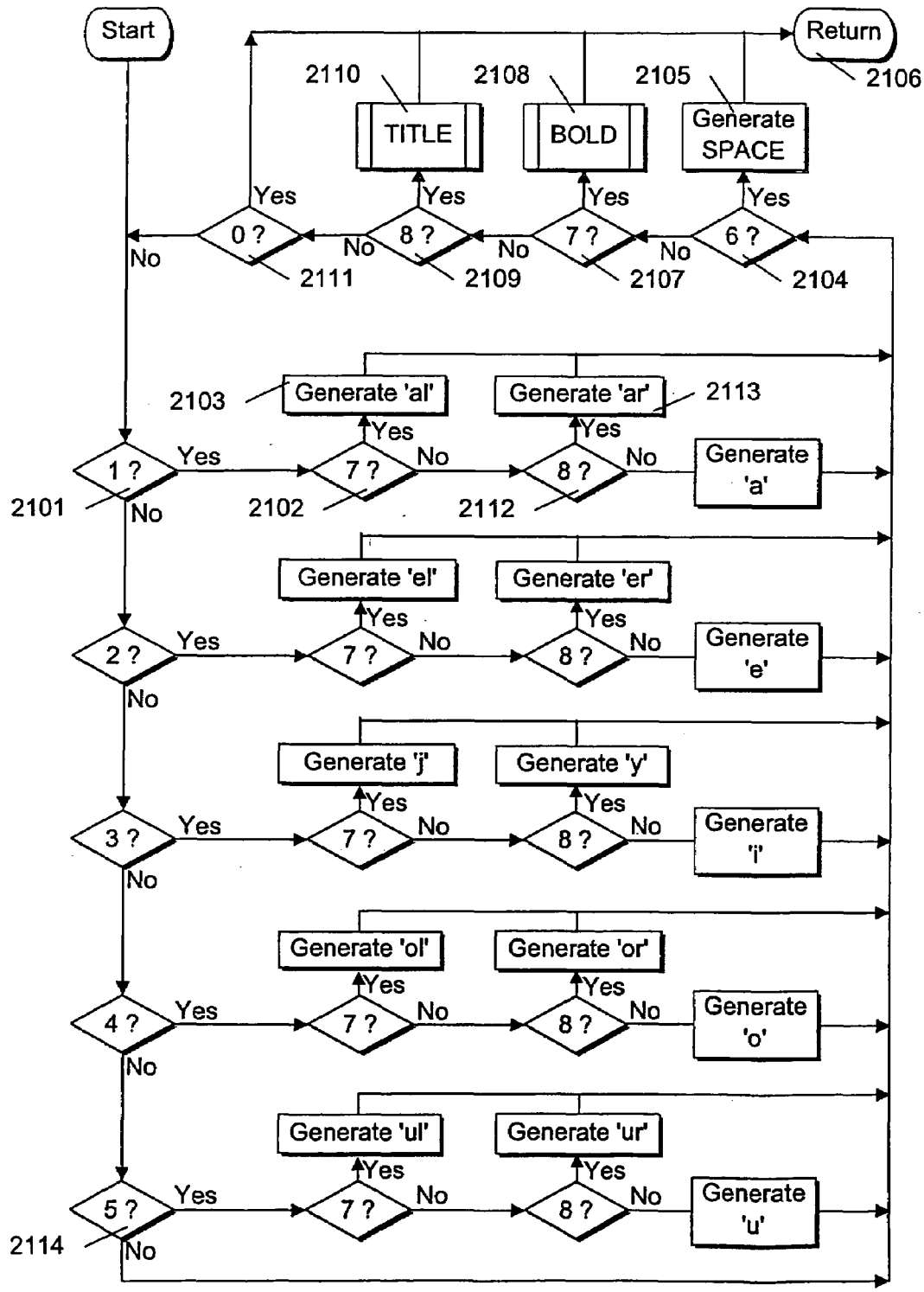

Step 1404 then identifies the vowel add-ons as described in flow chart, FIG. 21. The procedure then ends by 'Return' (step 1405), whereupon continuation is from 'Start'.

If the answer in step 1402 is 'No', step 1406 carries out verification whether the control sign is 'B'. If 'Yes', step 1407 will identify the B shortcuts, as illustrated later by the example of the Z-Shortcut. Step 1404 then again identifies the vowel add-ons whereupon the procedure ends by 'Return' (step 1405), after which continuation is from 'Start'.

If the answer in step 1406 is 'No', step 1408 carries out verification whether the control sign is 'C'. If 'Yes', step 1409 will identify the C shortcuts. Step 1404 then again identifies the vowel add-ons whereupon the procedure ends by 'Return' (step 1405).

Checking for control signs 'D' to 'X' is carried out in analogous fashion by steps 1410 to 1420 whereby the respective consonant shortcuts are identified by steps 1411 to 1421 or 1422 followed by vowel add-ons (step 1404) and 'Return' (step 1405).

Figure 15:
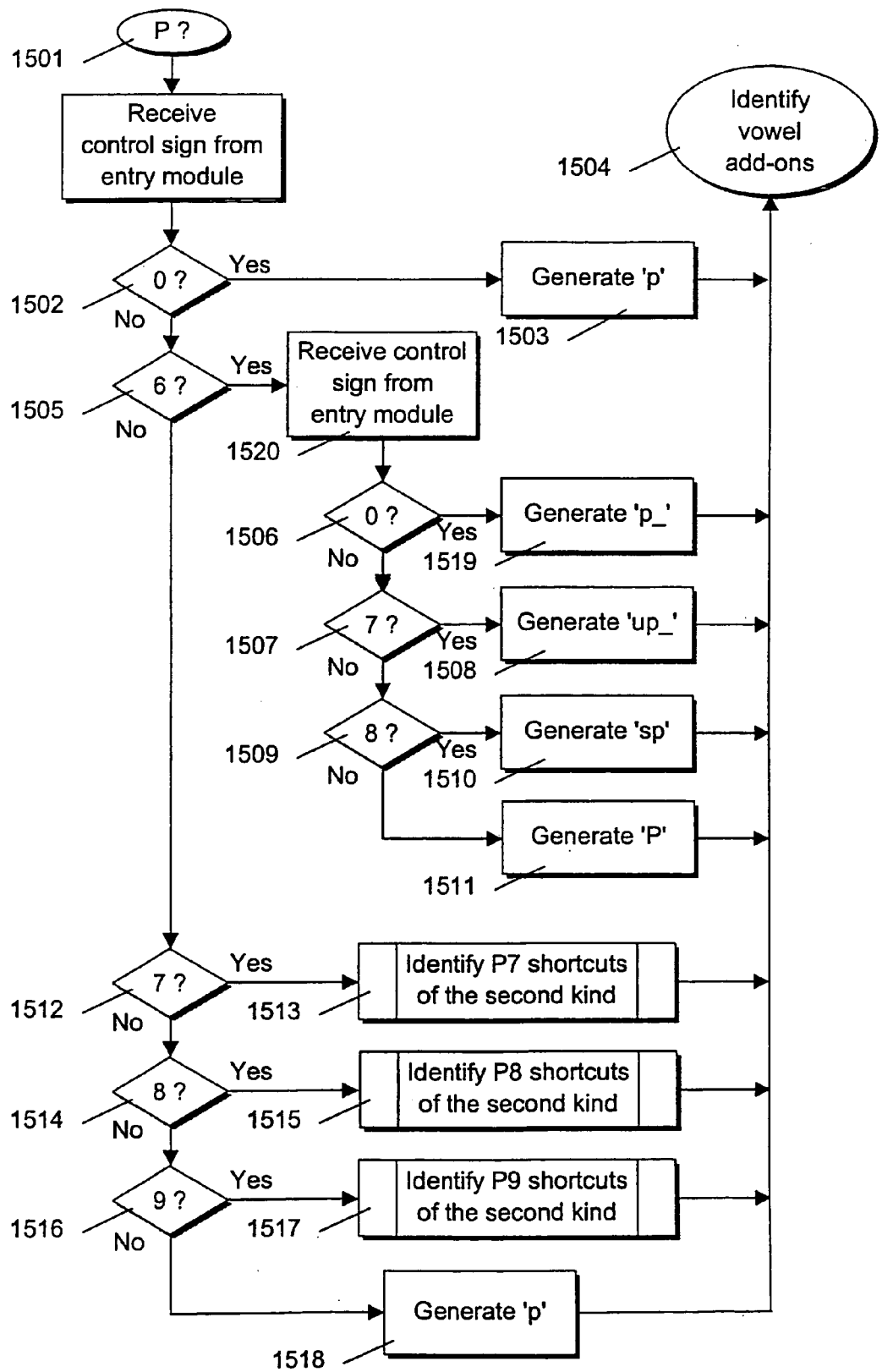

If the answer in step 1420 is 'No', step 1422 will identify the Z shortcuts as described in flow chart, FIG. 15.

FIG. 15 shows a flow chart to determine the consonant short cuts, namely the P short cuts. This section of the program starts with step 1501. In step 1501 control sign 'P' was identified.

Control signs generated in the entry module are read and processed by the processing module.

Next step, 1502, carries out verification whether the control sign is '0'. If 'Yes', step 1503 will generate the letter 'p'. Step 1504 then identifies the vowel add-ons.

If the answer in step 1502 is 'No', step 1505 carries out verification whether the control sign is '6'. If 'Yes', step 1520 will read the next control sign.

If menu windows are to be displayed, these will be triggered between steps 1505 and 1520. Thus, e.g. a nine-square window (FIG. 10A) or the five-square window (FIG. 10B), will show up in the case where the medium degree of tutoring has been selected.

Next step, 1506, carries out verification whether the control sign is '0'. If 'Yes', step 1519 will generate the letter 'p' followed by a space. Step 1504 then identifies the vowel add-ons.

If the answer in step 1506 is 'No', step 1507 carries out verification whether the control sign is '7'. If 'Yes', step 1508 will generate the word 'up_' followed by a space. Step 1504 then identifies the vowel add-ons.

If the answer in step 1507 is 'No', step 1509 carries out verification whether the control sign is '8'. If 'Yes', step 1510 will generate the letter sequence 'sp'. Step 1504 then identifies the vowel add-ons.

If the answer in step 1509 is 'No', step 1511 will generate the letter 'P'. Step 1504 then identifies the vowel add-ons.

If the answer in step 1505 is 'No', step 1512 carries out verification whether the control sign is '7'. If 'Yes', step 1513 will determine the P7 shortcuts of the $2^{nd}$ kind as described in flow chart, FIG. 18 with the L7 shortcuts of the $2^{nd}$ kind. Step 1504 then identifies the vowel add-ons.

If the answer in step 1512 is 'No', step 1514 carries out verification whether the control sign is '8'. If 'Yes', step 1515 will determine the P8 shortcuts of the $2^{nd}$ kind. Step 1504 then identifies the vowel add-ons.

If the answer in step 1514 is 'No', step 1516 carries out verification whether the control sign is '9'. If 'Yes', step 1517 will determine the P9 shortcuts of the $2^{nd}$ kind. Step 1504 then identifies the vowel add-ons.

If the answer in step 1516 is 'No', step 1518 will generate the letter 'p'. Step 1504 then identifies the vowel add-ons.

The flow charts of the consonant shortcuts differ in their content only. They are identical in structure.

Figure 16:
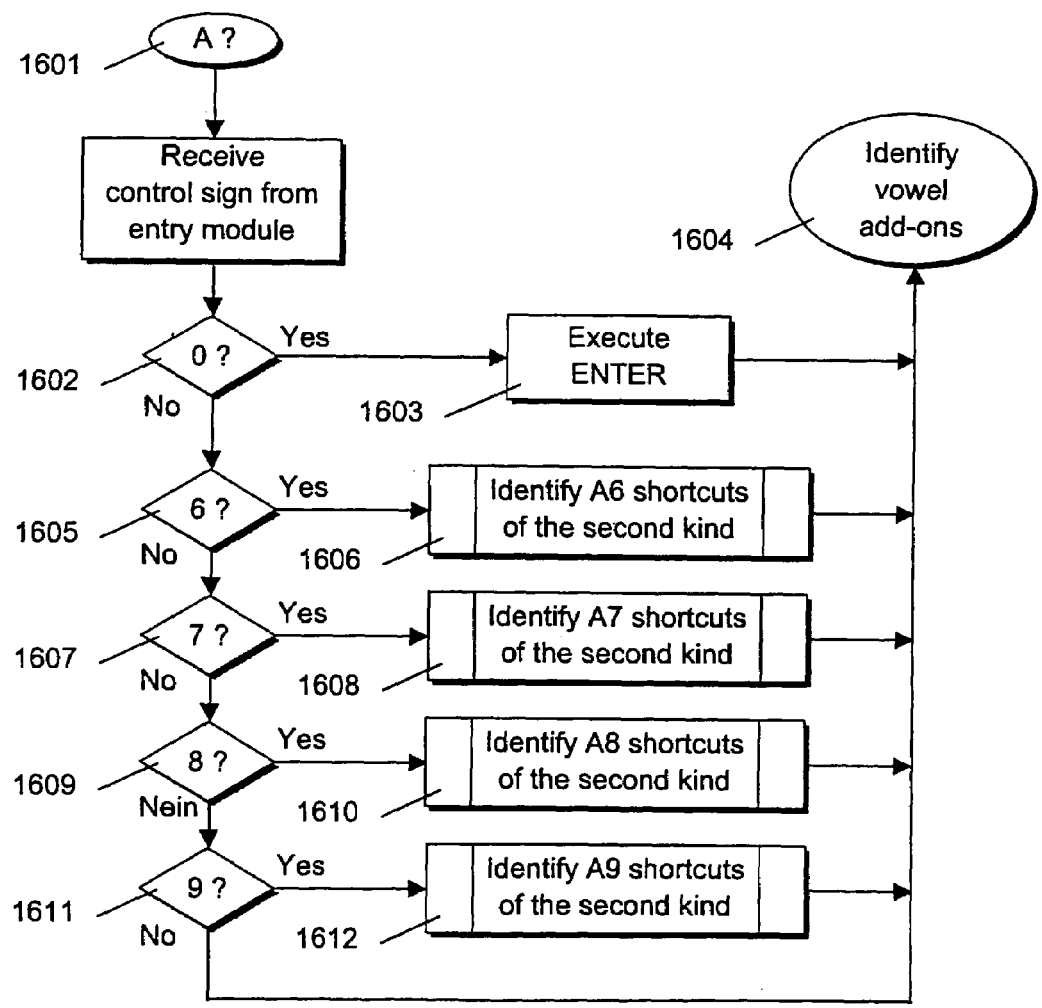

FIG. 16 shows a flow chart to determine the vowel shortcuts. This section of the program starts with step 1601. In step 1601 control sign 'A' was identified.

Control signs generated in the entry module are read and processed by the processing module.

Next step, 1602, carries out verification whether the control sign is '0'. If 'Yes', step 1603 carries out the function 'ENTER'. Step 1604 then identifies the vowel add-ons.

If the answer in step 1602 is 'No', step 1605 carries out verification whether the control sign is '6'. If 'Yes', step 1606 will determine the A6 shortcuts of the $2^{nd}$ kind as described in FIG. 17. Step 1604 then identifies the vowel add-ons.

If the answer in step 1605 is 'No', step 1607 carries out verification whether the control sign is '7'. If 'Yes', step 1608 will determine the A7 shortcuts of the $2^{nd}$ kind as described in FIG. 18. Step 1604 then identifies the vowel add-ons.

If the answer in step 1607 is 'No', step 1609 carries out verification whether the control sign is '8'. If 'Yes', step 1610 will determine the A8 shortcuts of the $2^{nd}$ kind. Step 1604 then identifies the vowel add-ons.

If the answer in step 1609 is 'No', step 1611 carries out verification whether the control sign is '9'. If 'Yes', step 1612 will determine the double tap shortcuts as described in FIG. 19. Step 1604 then identifies the vowel add-ons.

If the answer in step 1611 is 'No', the vowel add-ons are identified (step 1604).

Menu windows are displayed according to FIG. 10B, similarly as described in FIG. 15

Figure 17:
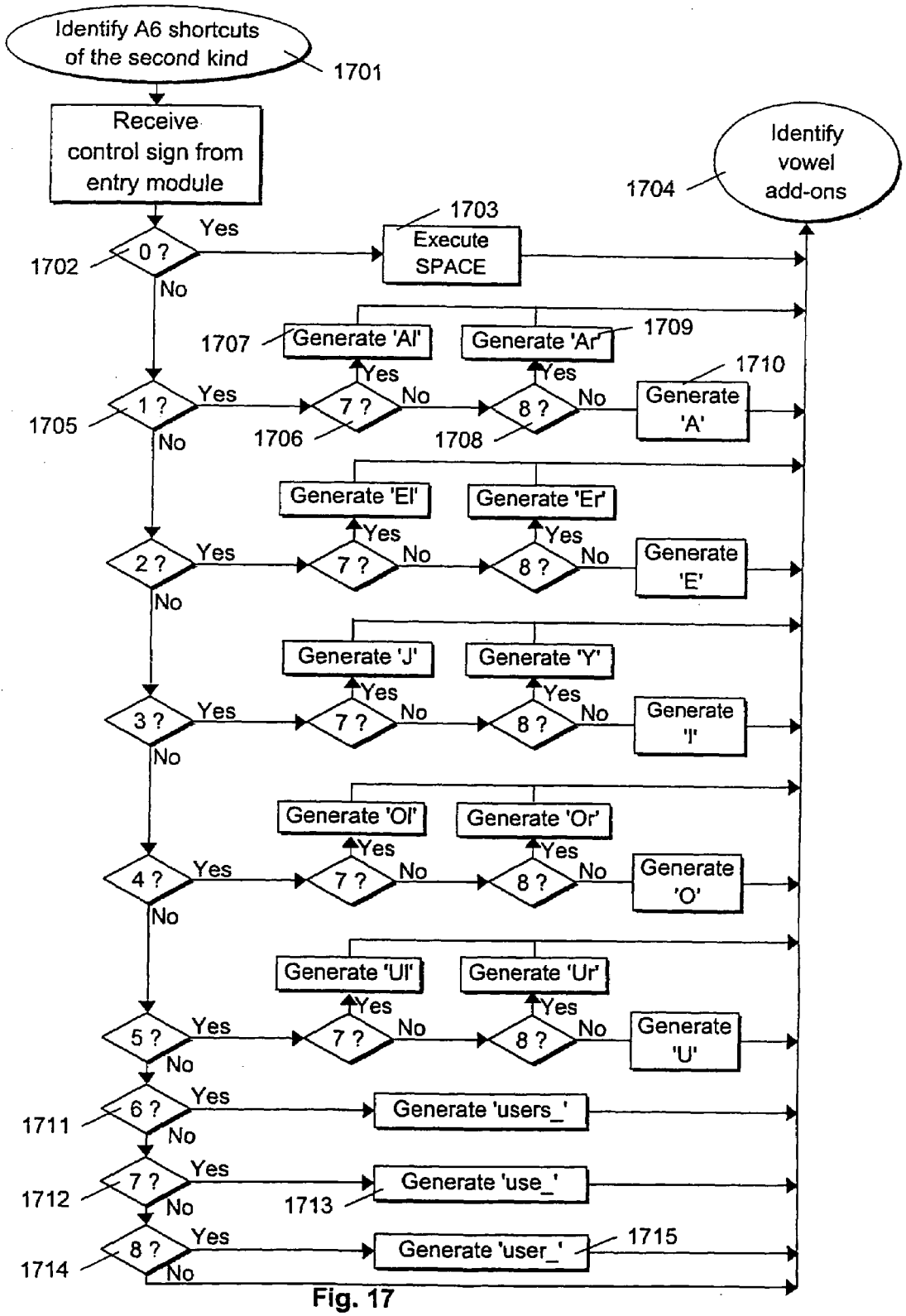

FIG. 17 shows a flow chart to determine the A6 shortcuts of the $2^{nd}$ kind. This section of the program starts with step 1701. Step 1701 followes step 1605 (FIG. 16) where control sign '6' was identified.

Control signs generated in the entry module are read and processed by the processing module.

Next step, 1702, carries out verification whether the control sign is '0'. If 'Yes', step 1703 carries out the function 'SPACE'. Step 1704 then identifies the vowel add-ons.

If the answer in step 1702 is 'No', step 1705 carries out verification whether the control sign is '1'. If 'Yes', a control sign is read (not shown). Step 1706 carries out verification whether the control sign is '7'. If the answer is 'Yes', step 1707 will generate the letter sequence 'Al'. Step 1704 then identifies the vowel add-ons.

If the answer in step 1706 is 'No', step 1708 carries out verification whether the control sign is '8'. If 'Yes' step 1709 will generate the letter sequence 'Ar'. Step 1704 then identifies the vowel add-ons.

If the answer in step 1708 is 'No', step 1710 will generate the letter 'A' in capital lettering. Step 1704 then identifies the vowel add-ons.

Checking for control signs '2', '3' to '6' is carried out in analogous fashion whereby the respective letters and letter sequences e.g. 'J', 'Y', 'Ol' and capital lettering are identified. Step 1704 then identifies the vowel add-ons.

If the answer in step 1711 is 'No', step 1712 carries out verification whether the control sign is '7'. If 'Yes' step 1713 will generate the word 'use_' followed by a space. Step 1704 then identifies the vowel add-ons.

If the answer in step 1712 is 'No', step 1714 carries out verification whether the control sign is '7'. If 'Yes' step 1715 will generate the word 'user_' followed by a space. Step 1704 then identifies the vowel add-ons.

If the answer in step 1714 is 'No', step 1704 identifies the vowel add-ons.

Figure 18:
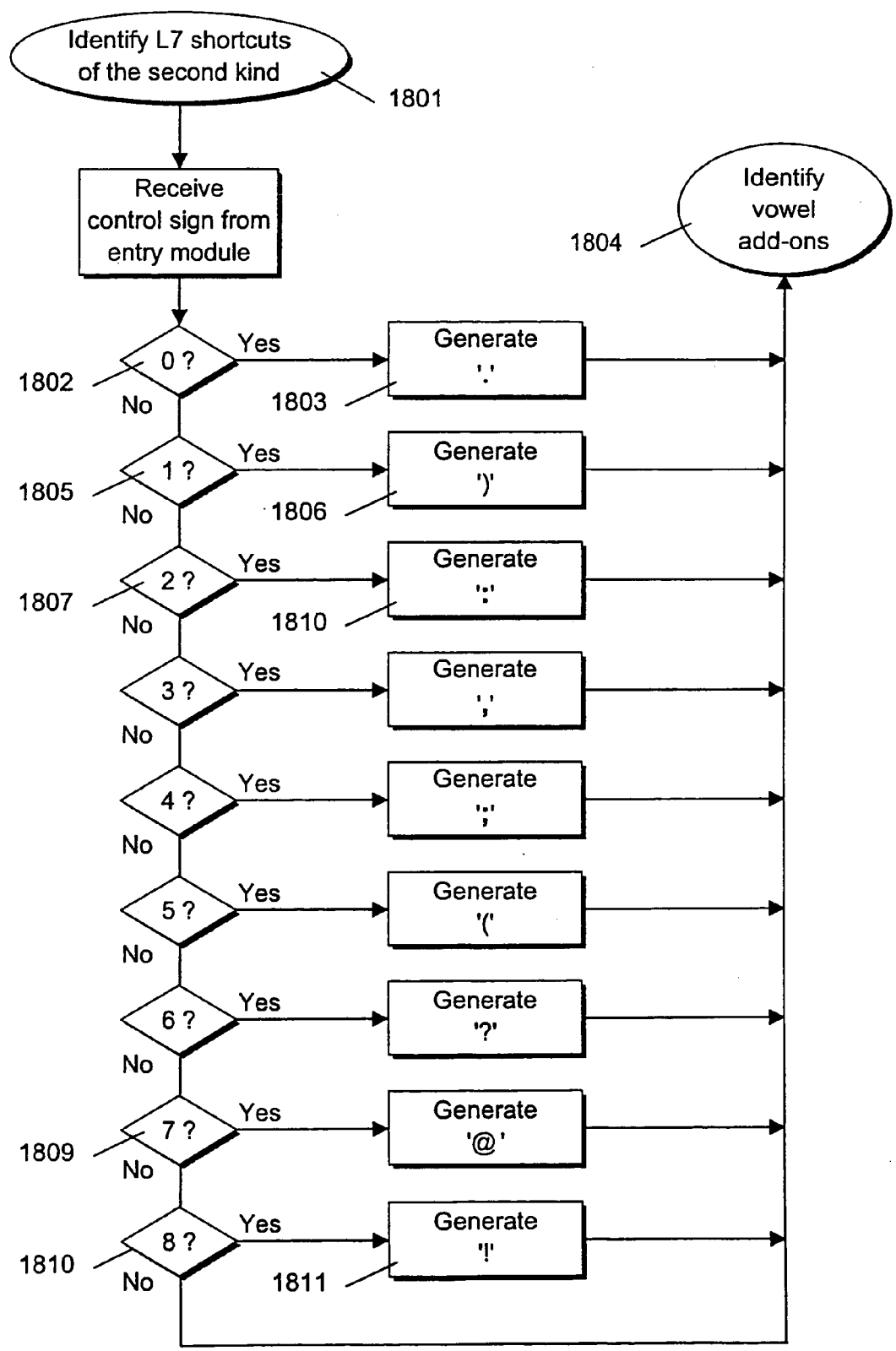

FIG. 18 shows a flow chart to determine the L7 shortcuts of the 2$^{nd}$ kind. This section of the program starts with step 1801. Step 1801 follows step 1605 (FIG. 16) where control sign '7' was identified.

Control signs generated in the entry module are read and processed by the processing module.

Next step, 1802, carries out verification whether the control sign is '0'. If 'Yes', step 1803 will generate the special sign '.'. Step 1804 then identifies the vowel add-ons.

If the answer in step 1802 is 'No', step 1805 carries out verification whether the control sign is '1'. If 'Yes', step 1806 will generate the special sign ')'. Step 1704 then identifies the vowel add-ons.

If the answer in step 1805 is 'No', step 1807 carries out verification whether the control sign is '2'. If 'Yes', step 1810 will generate the special sign ':'. Step 1704 then identifies the vowel add-ons.

Checking for control signs '3', '4' to '7' is carried out in analogous fashion whereby the respective special signs are generated.

If the answer in step 1809 is 'No', step 1810 carries out verification whether the control sign is '8'. If 'Yes', step 1811 will generate the special sign '!'. Step 1704 then identifies the vowel add-ons.

If the answer in step 1810 is 'No', step 1804 will identifies the vowel add-ons.

The flow charts of A7 to Z7 shortcuts of the 2$^{nd}$ kind and the flow charts of A8 to Z8 shortcuts of the 2$^{nd}$ kind differ in their content only. They are identical in structure.

The L key was choosen as the starting point for the special signes, because barely a frequent word starts with the letter L.

Figure 19:
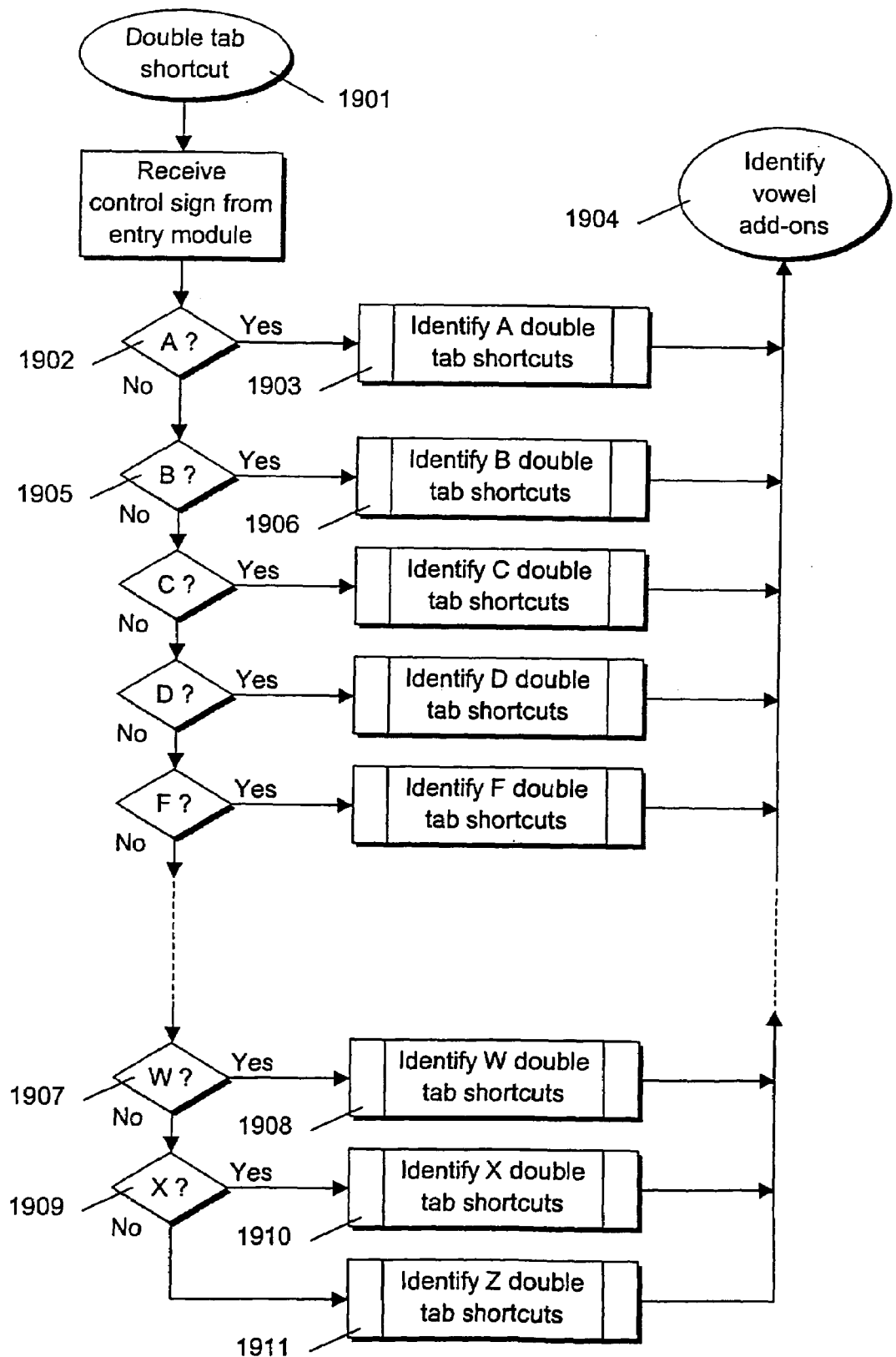

FIG. 19 shows a flow chart to determine the double tap short cuts. This section of the program starts with step 1901. In step 1901 a double tap was actuated on the vowel key and a tap on any of the keys.

Control signs generated in the entry module are read and processed by the processing module. Processing of control signs is started when a control sign is received from the entry module (step 1901).

Next step, 1902, carries out verification whether the control sign is 'A'. If 'Yes', step 1903 will identify the A double tap shortcuts.

Step 1404 then identifies the vowel add-ons as described in flow chart, FIG. 21. The procedure then ends by 'Return' (step 1405), whereupon continuation is from 'Start'.

If the answer in step 1902 is 'No', step 1405 carries out verification whether the control sign is 'B'. If 'Yes', step 1906 will identify the B double tap shortcuts.

Step 1404 then again identifies the vowel add-ons.

Checking for control signs 'C' to 'W' is carried out in analogous fashion whereby the respective double tap shortcuts are identified followed by vowel add-ons (step 1404).

Step 1907 will carry out a verification, whether the control sign is 'W'.

Figure 20:
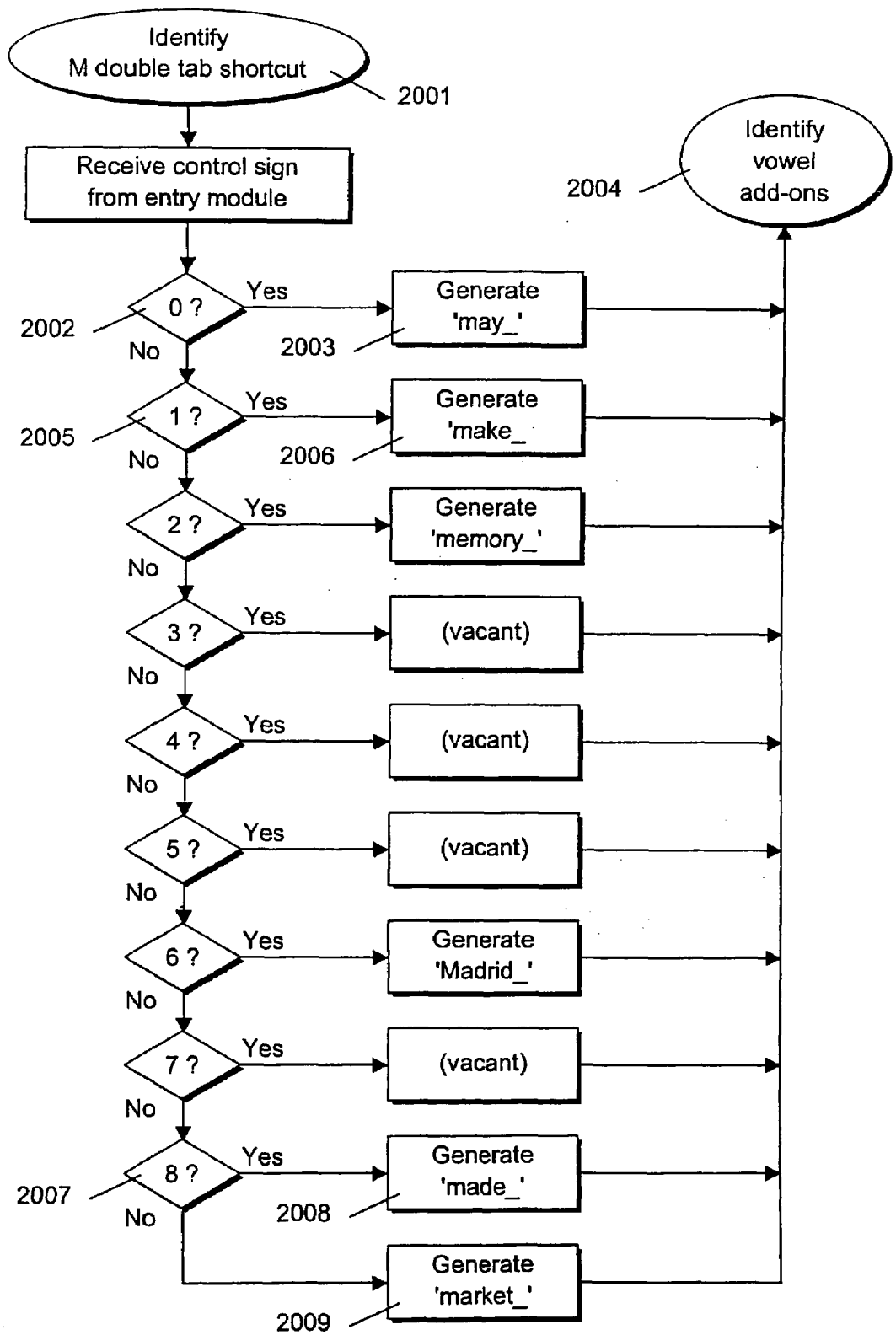

If the answer is 'Yes', step 1908 will identify the W double tap as described in flow chart, FIG. 20 with the M double tap shortcuts.

Step 1904 then identifies the vowel add-ons.

If the answer in step 1907 is 'No', step 1909 will carry out a verification, whether the control sign is 'X'.

Step 1404 then again identifies the vowel add-ons.

If the answer in step 1909 is 'No', step 1911 will identify the Z double tap shortcuts. Step 1404 then again identifies the vowel add-ons.

FIG. 20 shows a flow chart to determine the double tap short cuts. This section of the program starts with step 2001. In step 2001 control sign 'M' was identified.

Control signs generated in the entry module are read and processed by the processing module. Processing of control signs is started when a control sign is received from the entry module (step 1901).

Next step, 2002, carries out verification whether the control sign is '0'. If 'Yes' the word 'may_' followed by a space will be generated.

Step 2004 then identifies the vowel add-ons as described in flow chart, FIG. 21.

If the answer in step 2002 is 'No', step 2005 carries out verification whether the control sign is '1'.

If 'Yes', step 2006 will generate the word 'make_'.

Step 2004 then again identifies the vowel add-ons.

Checking for control signs '2' to '8' is carried out in analogous fashion whereby the respective words will be generated followed by vowel add-ons (step 1404).

Step 2007 will carry out a verification, whether the control sign is '8'.

If the answer is 'Yes', step 2008 will generate the word 'made_' followed by a space. Step 2004 then identifies the vowel add-ons.

If the answer in step 2007 is 'No', step 2009 will generate the word 'market_' Step 2004 then again identifies the vowel add-ons.

FIG. 21 shows a flow chart to determine the vowel add-ons. In this section of the program the control signs are determined, which generate vowels, the space and special functions. The control signs 7 and 8 cause a special function, which causes the word generated to be replaced by the same word in bold typeface followed by a space, or by the same word as a title in somewhat larger type and in bold typeface followed by a space. A program loop allows all sequential combinations of the vowels and functions. A control sign is read right before step 2101 (not shown).

Step 2101, carries out verification whether the control sign is '1'. If 'Yes', a control sign is read (not shown). Step 2102 carries out verification whether the control sign is '7'. If the answer is 'Yes', step 2103 will generate the letter sequence 'al'. Step 2104 then carries out verification whether the control sign is '6'. If 'Yes', step 2105 carries out the function 'SPACE', whereupon the program segment ends with 'Return' (step 2106).

If the answer in step 2104 was 'No', step 2107 will verify whether control sign '7' had been identified. If 'Yes', the just written, or generated, word is replaced by the same word in bold letters (step 2108), whereupon the program segment ends by 'Return' (step 2106).

If the answer in step 2107 was 'No', step 2109 will verify whether control sign '8' had been identified. If 'Yes', the just written, or generated, word is replaced by the same word as a title in somewhat larger type and in bold letters (step 2110), whereupon the program segment ends by 'Return' (step 2106).

If the answer in step 2109 was 'No', step 2111 will verify whether the control sign is '0' (pen is lifted up). If 'Yes', the program segment ends by 'Return' (step 2106).

If the answer in step 2111 was 'No', the program loop is closed by reading another control sign and executing step 2101.

If the answer in step 2102 was 'No', step 2112 will verify whether control sign '8' had been identified. If 'Yes', letter sequence 'ar' is generated (step 2113); continuation will be by step 2104.

Checking for control signs '2' to '5' is carried out in analogous fashion whereby the respective words and letter sequences will be generated followed by step 2104.

If the answer in step 2114 was 'No', continuation is in step 2104.

Due to application of eight stroke directions, Tap and Double Tap eliminates the need of keys for vowels, j, y, space, punctuation symbols and numerals. Only 40 to 50% of the keys of a QWERTY keyboard are needed and represented, making the key section very clear (small search zone), and only very short distances need to be travelled by the pen. Vowels and space make up 50% of the keying actions. By remembering the six stroke directions, the user will save key searching and travelling distance to the desired key in all these cases.

Vowel connections have a high incidence in languages. The high speed writing method enables chaining of the various directions in which the pen can be moved, without lifting it off from the entry surface. Entering combinations such as, e.g., 'ou', 'ea' or 'ee' is thus very fast and simple.

The seven consonants in the immediate neighbourhood of the central T key, including consonant T itself (key section specific to the English language), make up 76% of the consonant keys used, from the standpoint of frequency of use. More than three quarters of all keying operations occur, thus, in this core zone.

It follows that this combination of key strokes with the simplest chainable 'writing signs' (Strokes, Taps ,and Double Taps) features amazing advantages.

This on-screen keyboard is especially suited for small monitors (watches, mobile phones, SMS, WAP. It requires only five percent of the area of a QWERTY keyboard (for ten-fingers application) which entails great weight savings.

The present invention has the advantage over all other known text entering systems and can take their place. The future user does not need to know about and change between 'Graffiti'-alphabet, SMS entry or the touch system.

Assignment of the eight stroke directions is very easy to remember. The straight down direction represents the I, since I is also written from top down. The vowels are arranged clockwise in alphabetical order. They are all situated on and below the horizontal axis. The three stroke directions located above are reserved for other functions.

Umlauts in the German version, e.g. are characterized by a stroke 'up', since the dots are also arranged above A, O, or U. Accents in other languages are similarly placed (â, é, or ô). The method is also adaptable in other respects to all languages with a sound-alphabet, including japanese.

The hand rest area is located at the same level as the monitor, favoring relaxed positioning. Due to comfortable hand position the pen can be guided precisely by movement of the fingers alone. The hand itself does not need to be guided as is the case for longhand (handwriting) and shorthand (e.g. per Stolze/Schrey), thus needing less space (the arm does not move) and rendering the writing process more elegant. Furthermore, writing in standing position does not present a problem, opening up new applications, e.g. for media reporters.

At comparable practice effort the method will afford significantly higher writing speed than the QWERTY-keyboard.

The familiar type-face remains unchanged, taking into account capital/lower case writing and complete, correct spelling. No new, shortened and incorrect type-face needs to be memorized as is the case for shorthand. Nor does the written text need to be deciphered at great effort but has been electronically acquired and is apt for further use. Selection of words from a list is never required during the writing process. This enables the user to concentrate his attention on the entry pad alone.

Shortcuts and double tap shortcuts enable abbreviated entry of entire words. A set of the one hundred most frequent words is readily available on call. These hundred words constitute 50% of the written language; the 50 most frequent words even make up 45%.

The presentation of these words by menu windows (e.g. nine-square window) and simple assignment of word location matching the stroke directions result in surprising acceleration of the writing process and of learning advances.

Many vacant spots still are available for individual words supporting a matching, easy to memorize shortcut or double tap shortcut. Even if the user is familiar with basic functions only, the high speed writing device will soon benefit him substantially.

A tap executed on the Q key generates the letter 'q' followed by letter 'u' since q is always followed by u in the English language.

The simple sign set warrants a virtually 100% recognition rate of the entry. Rather imprecise identification trials by statistical means, referring to a large size vocabulary, are, therefore, not required, resulting in little memory space needed. The simple structure of the short program results in undelayed display of the text entered.

In contrast with programs based on "artificial intelligence" or on "self-learning ability" direct, undisturbed entry of names, addresses, expert vocabulary, and poetry is easy and accurate.

The present invention has been developed with user-friendliness in all aspects as the central motivation.

With the present invention existing models can be upgraded without requiring new hardware components—having todays supply problems—novel devices can be launched.

Figure 22:
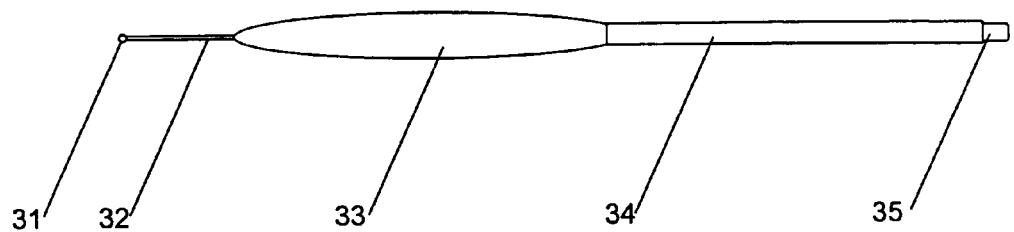

FIG. 22 shows a pen for use with the high speed writing device for selecting keys on the touch screen and for carrying out strokes. The pen executes pen movements although it is not a writing device in the original sense.

A slightly curved handle section 33 features a tip 32 at one end having a spherical or rounded tip 31. Tip 32 is as thin as possible and is preferably made of steel. At the other end of the handle section 33 there is a cylindrical extension 34 that ends, in turn, in a button-like portion 35. By pressing button 35, components 32 and 34 will be retracted into handle section 33 and can be extended again by pushing the button once more. The special shape provides better view onto the key section which is especially useful for writing by means of menu windows.

Figure 23A:
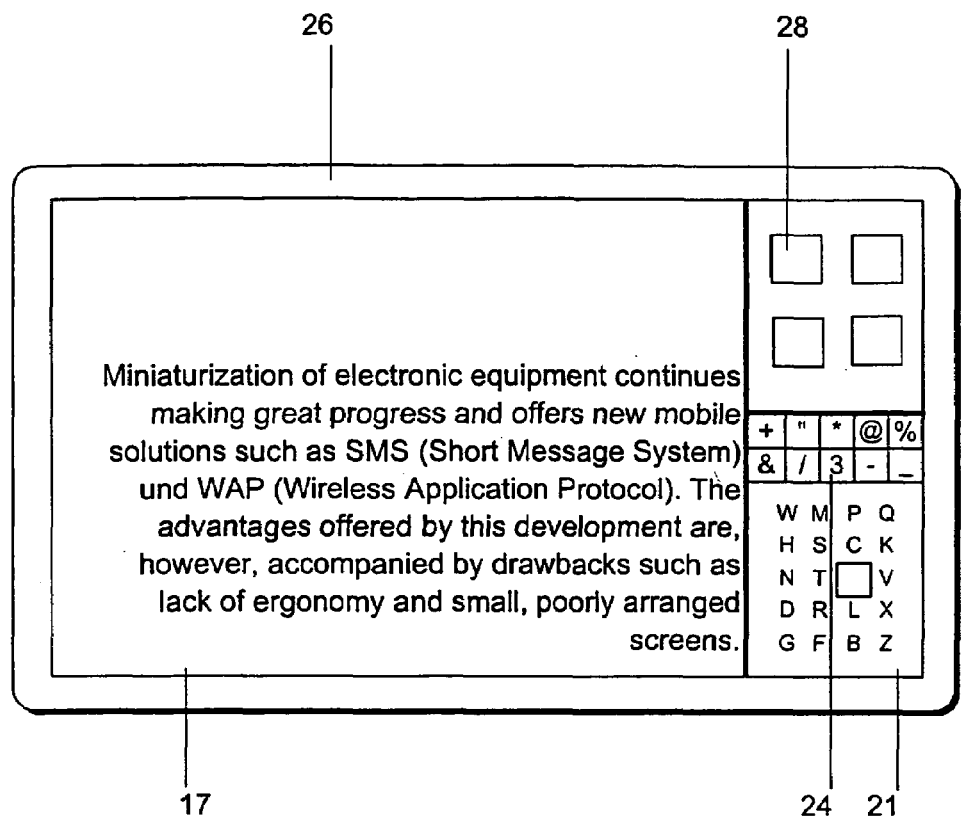

FIG. 23A shows a 'palmtop' configured as high speed writing device as a first example of a practical realization.

The monitor features an entry section and a text section 17. The monitor is mounted in case 26.

The entry section is subdivided into key section 21, a special key section 24 with a number key and further section located above it that accommodates icons 28. Key section 21 contains the vowel key and the surrounding consonant keys. This monitor arrangement is most advantageous for right-handed operators. They will generally enter data on the right hand part of the monitor area while the left hand side displays text entered.

Icons are intended for frequently used program functions. They are familiar from commonly used actuating areas such as found in organizer applications with designations such as 'appointments', 'addresses', 'calculator', etc.

Figure 23B:
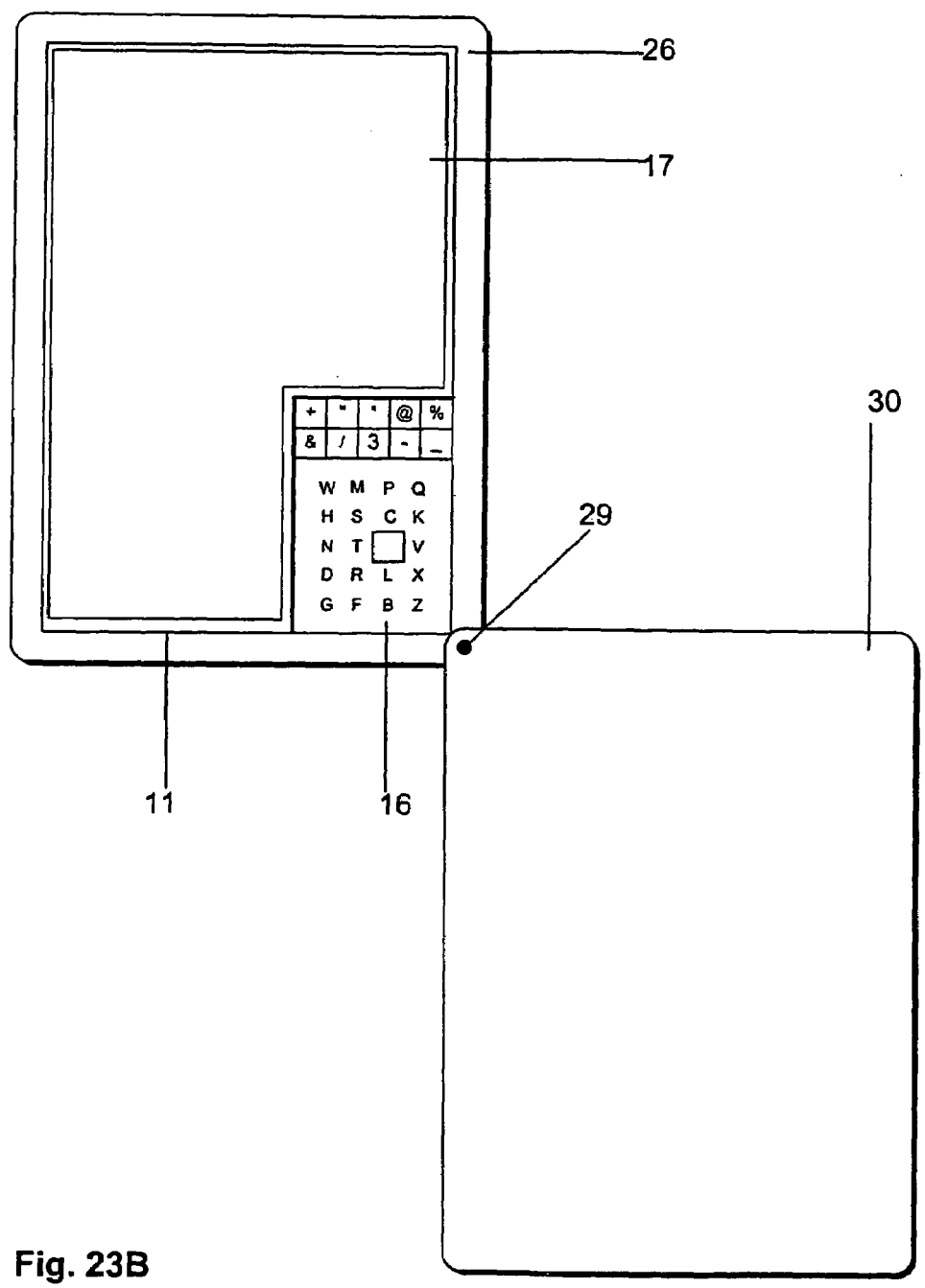

FIG. 23B shows a 'palmtop' with swing-open cover as a second example of a practical realization. The illustration shows case 26, monitor 11 with entry section 16 and text section 17. A protective, lockable cover 30 swinging around vertical axis 29, is attached in one corner of the case. In the opened position It serves as a comfortable hand rest. The cover is swung out by 180 degrees. In the case of a ‚landscape'-configured device the cover swings out by 270 degrees. It is recommended arranging the key section/window along the upper edge of the monitor (not shown).

Figure 23C:
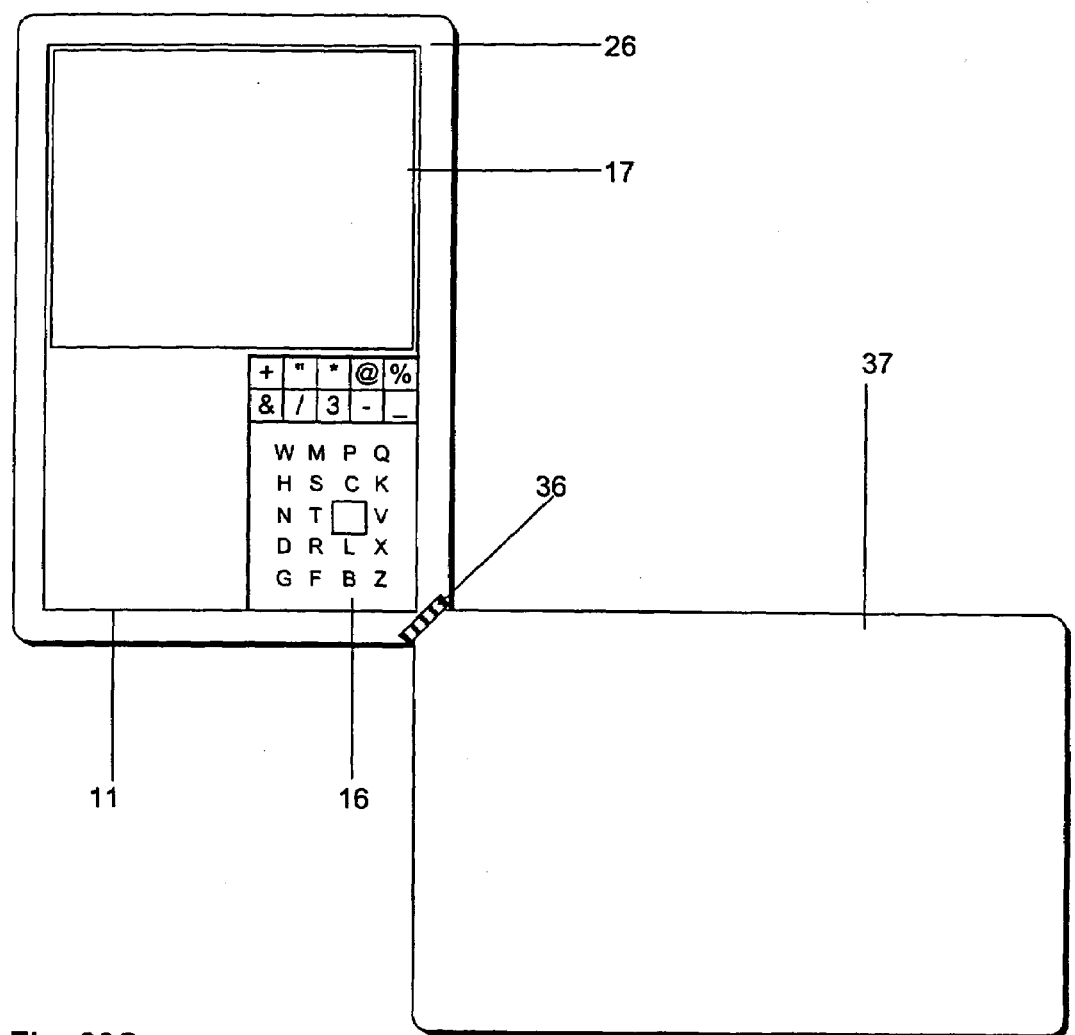

FIG. 23C shows a third example of a practical realization of a 'palmtop' monitor 11 with entry section 16 and text section 17 according to FIG. 23B. A cover story 37 can swing out and is lockable, making it useful as a comfortable hand rest. A hinge 36 is located on the edges of the case at an angle of 40 to 50 degrees.

Figure 24:
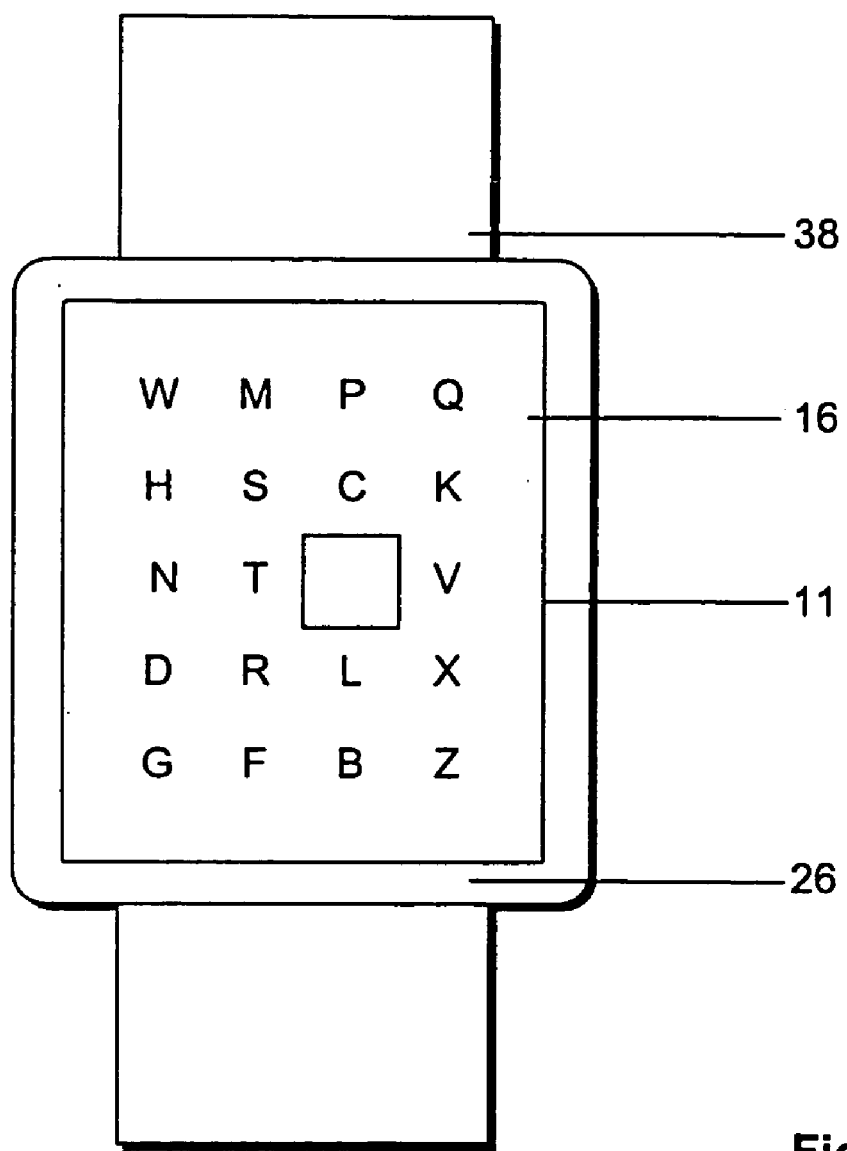

FIG. 24, shows a watch as a third example of a practical realization where the high speed writing device has been integrated. The case 26 with monitor 11 and entry section 16 are arranged on a bracelet 38.

Various windows can be displayed on the monitor. In many cases they fill up the screen completely as illustrated by the key section shown. Further windows are the common and familiar watch functions, a window for the text section and a window each for appointments and addresses etc. The key section window is addressed by 'Double Tap' on the X key which causes a menu window to appear. A 'tap' on the 'EXIT' key closes that window. The other two windows feature at least two keys (forward and backward) which permit navigating through the menu windows.

During entry, the writing hand rests on the back of the other hand which makes for comfortable writing when standing upright.

Additional incorporation of mobile phones into watches is a natural option since the high speed writing device is optimally suited to entering SMS texts.

Figure 25A:
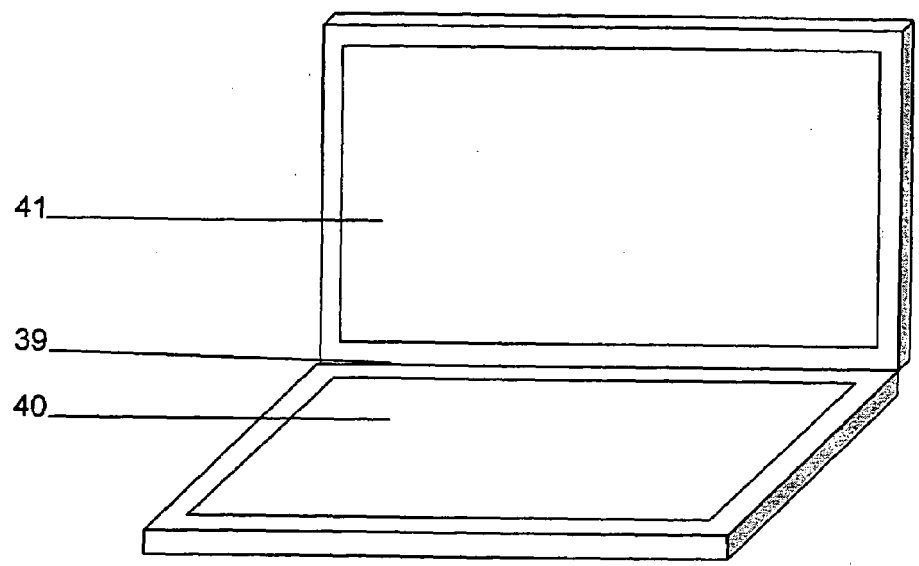

FIG. 25A represents a first example of a practical realization of a lap top PC with hinge 39 featuring two flip-open surfaces. This allows for doubling the screen area, whereby this two-part screen surface 40, 41 can be manufactured at significantly lower total cost since the rejection rate of large touch-screen surfaces increases faster than linearly. When the two screens are shut they are well protected from handling hazards when transported which is an important advantage.

Various combinations of screen types are possible such as both monitors in color or one monitor in color, the other black and white.

Figure 25B:
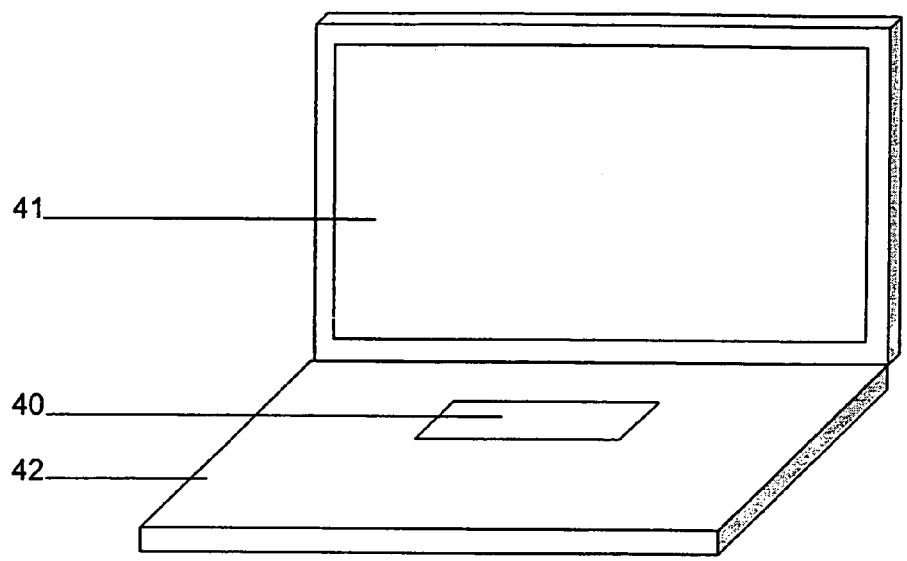

FIG. 25B shows a second example of a practical realization of a laptop PC as an alternative. Monitor 41 has been chosen in color while monitor 41 is small and in black and white, whereby the arrangement of the small monitor is such as to allow much room for hand rest area 42. A specially cost-effective design simply features a touch-sensitive surface with a printed keyboard section. An analogous configuration may also be used for palmtop applications. The laptop variants described here can, of course, be applied to stationary applications, such as desk top PCs without any drawback whatsoever.

I claim:

1. Method for a high speed writing system embodied by a pen entering characters and symbols on the entering section of a touch screen, comprising within it, a key section, consonant keys, and only a single vowel key in such a way that, by means of data processing, letters, letter sequences, syllables, words, and special symbols, are generated, or functions executed, whereby
   a) the pen is set down, at least once, on a pre-selected key and is again lifted off from it,
   b) the pen is set down on a pre-selected key, is then moved in one of eight stroke directions, and is subsequently lifted off again, and
   c) the pen is set down on a pre-selected key, is then moved in one of eight stroke directions, and is subsequently moved, again, in one of eight stroke directions, and is then lifted off again,
   wherein steps a), b), and c) are combined, respectively, and wherein said single vowel key provides different vowels depending on the direction of a stroke across the key, thus creating a high speed writing method and system by only few strokes of the pen.

2. Method per claim 1, wherein the entry is executed as a 'Tap' on a consonant key, thus generating consonants, or
   as a 'Double Tap' on a consonant key, thus typically generating double consonants, and sequences of letters.

3. Method per claim 1, wherein the entry is executed as a 'Stroke' starting from a consonant key, whereby the 'Stroke' is carried out in at least one of five of the eight stroke directions assigned to vowels A, E, I, O, U, thus generating the selected consonant by the consonant key followed by the vowel, or by the combination of vowels, belonging to the 'Stroke'.

4. Method per claim 1, wherein the entry is executed as a 'Stroke' from the single vowel key, whereby the 'Stroke'
   is carried out in one of five of the eight stroke directions assigned to vowels A, E, I, O, U, whereby the respective vowel is generated, or
   is carried out in a sixth stroke direction, whereby a space character is generated, or the 'SPACE' function is executed, or
   is carried out in a seventh stroke direction, whereby the 'BACK SPACE' function is executed
   is carried out in an eighth stroke direction, whereby the 'DELETE' function is executed.

5. Method per claim 1, wherein the entry is executed as a 'Stroke' from the single vowel key or a consonant key, whereby the 'Stroke'
   is carried out in one of five of the eight stroke directions assigned to vowels A, E, I, O, U, and—without any lifting off or setting down again—
is carried out in one of the five stroke directions assigned to vowels A, E, I, O,U,
whereby vowels are chained together, or
is carried out in a sixth stroke direction, whereby a space character is generated following the preceding vowel, or—the 'SPACE' function is executed, or
is carried out in a seventh stroke direction, whereby the letter J is generated replacing the preceding vowel, whereby the letter L is generated following the preceding vowel, or
is carried out in a eighth stroke direction, whereby the letter Y is generated replacing the preceding vowel, whereby the letter R is generated following the preceding vowel.

6. Method per claim 1, wherein the entry is done as 'Shortcut of the 2nd kind', starting from a consonant or the vowel key, whereby a pen movement is carried out in one of the three 'UP' directions of the eight stroke directions and—without any lifting off—is carried out in one of the eight stroke directions, thus generating frequent letter sequences or other letter sequences chosen by the user.

7. Method per claim 1, wherein the entry is done as 'Double Tap Shortcut', starting from the only vowel key, whereby starting from any key a pen movement is carried out as a 'Stroke', 'Tap', or 'Double Tap', thus generating frequent letter sequences or other letter sequences chosen by the user.

8. Method per claim 1, wherein the entry starts on the number key, whereby a 'Tap', generates number '0', or whereby a stroke in one of the eight stroke directions generates numbers '1' to '8', or whereby a 'Double Tap' generates number '9'.

9. Method per claim 1, wherein the entry is carried out as a stroke in a seventh direction, following immediately, and without lift-off, an already completed word, thus causing the word generated to be replaced by the same word in bold typeface, or such that the entry is carried out as a stroke in an eighth direction, whereby the word already generated is replaced by the same word as a title in somewhat larger type and in bold typeface.

10. Method per claim 1, wherein the entry is carried out as a 'Double Tap ' on one of the rarely used keys, preferably on the X key, whereby a menu window is opened up, wherefrom further functions can be selected.

11. Method per claim 10, wherein the further functions are a 'Tutoring' function, the 'EXIT' function, and the 'Number Key' function.

12. Method per claim 1, wherein the entry is carried out as a 'Tap', on the Q key, whereby the letter 'Q' is generated, followed by the letter 'U'.

13. Method per claim 1, wherein the entry is carried out by setting down once, the hand guiding the pen such that all keys are within reach.

14. Method per claim 1, wherein setting the pen down on any one key will cause a nine-square window of the 1st kind to open, whereby a word, a part of a word, a letter, a letter sequence, or a special symbol, is located in the center of the nine-square window and the other eight are arranged around it, if so chosen by the user of the students' assistant.

15. Method per claim 14 wherein, after calling up the nine-square window, the pen is guided in one of the eight stroke directions, causing a menu window in a nine-square of the 2nd kind window format to open, whereby a word, a part of a word, a letter, a letter sequence, or a special symbol is located in the center of the nine-square window and the other eight are arranged around it.

16. High speed writing device per claim 1 in mobile instruments such as laptop PCs, palmtop PCs and similar.

17. High speed writing device per claim 1 for entering text in watches.

18. High speed writing device per claim 1 for entering text in mobile phones.

19. High speed writing device per claim 1 for entering text in stationary devices, especially desktops.

20. High speed writing device for execution of the method per claim 1, comprising a pen, a touch-screen with an entry area, an entering section, a text section, and a key pad such that the touch-screen is connected via a first line to processor unit, and via a second line to monitor, and that the entry area comprises an entry section and a text section, both variable in size, whereby entry section is formed by a key arrangement with only a single vowel key, and consonant keys, and that a pen is provided for entering, and that entry processing is provided for by an entry module, a processing module inside a processor unit with a memory, and a software package.

21. High speed writing device per claim 20, wherein the key section is variable in size measuring about 2×4 centimeters.

22. High speed writing device per claim 20, wherein pen features a spherical or rounded tip, a handle section, a connecting portion and a cylindrical extension, whereby pushing of a button will retract the end part and the cylindrical extension into the handle section, and another push on the button will extend it again from the retracted position.

23. High speed writing device per claim 20, wherein a protective cover is arranged in swing-out fashion and lockable whereby the swung-open cover serves as a hand rest for the hand executing pen movements.

24. High speed writing device per claim 20, wherein cover is arranged in flip-open fashion and lockable whereby the open cover serves as a handrest for the hand executing pen movements.

25. High speed writing device per claim 20, wherein a separate entry section is located beside the monitor, featuring a touch-sensitive surface with a printed-on or with an adhesive-label keypad.

26. Method per claim 1, wherein the entry is executed as a 'Shortcut of the 1st kind', whereby the pen is set down on a key, is then moved in one of the three 'UP' directions, and is then lifted off.

27. Method per claim 26, wherein the entry is done as 'Shortcut of the 1st kind', starting from the consonant key,
whereby a pen movement is carried out in the sixth stroke direction, thus generating the selected consonant as a capital letter, or
whereby a pen movement is carried out in the seventh or eighth of the eight stroke directions, thus generating fixed or freely configurable letter sequences, syllables, or words.

28. Method per claim 1, wherein the entry is executed as a 'Shortcut of the 2nd kind', whereby the pen is set down on a key, is then moved in one of the three 'UP' directions followed by a stroke in one of the eight stroke directions, and is then lifted off.

29. Method per claim 28, wherein the entry is done as 'Shortcut of the 2nd kind', starting from the vowel key,
whereby a pen movement is carried out in one of the three 'UP' directions of the eight stroke directions, thus executing the functions 'SPACE', 'BACK SPACE' and 'DELETE',or
whereby a pen movement is carried out as a 'Double Tap', thus starting the functions 'Double Tap Shortcuts'.

30. High speed writing device for execution of a method for a high speed writing system embodied by a pen entering characters and symbols on the entering section of a touch screen, comprising within it, a key section, consonant keys, and a single vowel key in such a way that, by means of data processing, letters, letter sequences, syllables, words, and special symbols, are generated, or functions executed, whereby a) the pen is set down, at least once, on a pre-selected key and is again lifted off from it, b) the pen is set down on a pre-selected key, is then moved in one of eight stroke directions, and is subsequently lifted off again, and c) the pen is set down on a pre-selected key, is then moved in one of eight stroke directions, and is subsequently moved, again, in one of eight stroke directions, and is then lifted off again, wherein steps a), b), and c) are combined, respectively, thus creating a high speed writing method and system by only few strokes of the pen, the high speed writing device comprising a pen, a touch-screen with an entry area, an entering section, a text section, and a key pad such that the touch-screen is connected via a first line to a processor unit, and via a second line to a monitor, and that the entry area comprises an entry section and a text section, both variable in size, whereby entry section is formed by a key arrangement with a single vowel key, and consonant keys, and a pen is provided for entering, and entry processing is provided for by an entry module, a processing module inside the processor unit with a memory, and a software package;

wherein the case of the writing device is configured as a handrest which may be located to the left or to the right hand side of, and approximately parallel to, the touch-screen, and wherein the hand rest is situated approximately 4 millimeters above the touch-screen and has a size of approximately 9×13 centimeters.

\* \* \* \* \*